(12) United States Patent
Wang et al.

(10) Patent No.: US 11,902,026 B2
(45) Date of Patent: Feb. 13, 2024

(54) SIDELINK TRANSMITTING APPARATUS, RECEIVING APPARATUS AND COMMUNICATION METHODS

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 21 days.

(21) Appl. No.: 17/256,698

(22) PCT Filed: Dec. 28, 2018

(86) PCT No.: PCT/CN2018/124663
§ 371 (c)(1),
(2) Date: Dec. 29, 2020

(87) PCT Pub. No.: WO2020/133155
PCT Pub. Date: Jul. 2, 2020

(65) Prior Publication Data
US 2021/0266110 A1    Aug. 26, 2021

(51) Int. Cl.
*H04L 1/1812* (2023.01)
*H04W 4/40* (2018.01)
(Continued)

(52) U.S. Cl.
CPC .......... *H04L 1/1819* (2013.01); *H04L 1/0004* (2013.01); *H04L 1/1896* (2013.01);
(Continued)

(58) Field of Classification Search
CPC ... H04L 1/1819; H04L 1/0004; H04L 1/1896; H04W 4/40; H04W 72/0406; H04W 72/0446
See application file for complete search history.

(56) References Cited

U.S. PATENT DOCUMENTS

2017/0245282 A1    8/2017  Lee et al.
2018/0176892 A1*   6/2018  Kim .................... H04W 52/386
(Continued)

FOREIGN PATENT DOCUMENTS

CN    107995605 A    5/2018
JP    2017530587 A   10/2017

OTHER PUBLICATIONS

International Search Report, dated Sep. 30, 2019, for corresponding International Application No. PCT/CN2018/124663, 2 pages.
(Continued)

*Primary Examiner* — Benjamin H Elliott, IV
*Assistant Examiner* — Nevena Zecevic Sandhu
(74) *Attorney, Agent, or Firm* — Seed IP Law Group LLP

(57) ABSTRACT

The present disclosure is directed to a transmitting apparatus, a receiving apparatus and communication methods. The transmitting apparatus includes: a receiver, operative to receive, from a base station, first control information for sidelink communication between the transmitting apparatus and a receiving apparatus; and a transmitter, operative to transmit a physical sidelink shared channel to the receiving apparatus according to the first control information. The transmitter is operative not to transmit a first physical sidelink control channel to the receiving apparatus, or the transmitter is operative to transmit the first physical sidelink control channel with second control information to the receiving apparatus.

8 Claims, 19 Drawing Sheets

(51) Int. Cl.
*H04L 1/00* (2006.01)
*H04L 1/1867* (2023.01)
*H04W 72/0446* (2023.01)
*H04W 72/20* (2023.01)

(52) U.S. Cl.
CPC ......... *H04W 4/40* (2018.02); *H04W 72/0446* (2013.01); *H04W 72/20* (2023.01)

(56) References Cited

U.S. PATENT DOCUMENTS

| | | | |
|---|---|---|---|
| 2019/0029029 A1* | 1/2019 | Ohtsuji | H04L 5/00 |
| 2019/0230633 A1* | 7/2019 | Chae | H04L 5/0053 |
| 2019/0372647 A1* | 12/2019 | Su | H04W 16/28 |
| 2020/0084738 A1* | 3/2020 | Nguyen | H04W 56/002 |
| 2020/0359366 A1* | 11/2020 | Kim | H04L 1/1812 |
| 2022/0053521 A1* | 2/2022 | Yoshioka | H04L 5/0055 |
| 2022/0078718 A1* | 3/2022 | Hoshino | H04W 72/02 |

OTHER PUBLICATIONS

Oppo, "Discussion of Uu-based sidelink resource allocation and configuration," R1-11812813, Agenda Item: 7.2.4.3, 3GPP TSG RAN WG1 Meeting #95, Spokane, USA, Nov. 12-16, 2018, 5 pages.

\* cited by examiner

SIDELINK TRANSMITTING APPARATUS, RECEIVING APPARATUS AND COMMUNICATION METHODS

BACKGROUND

1. Technical Field

The present disclosure relates to wireless communication field, and in particular, to a transmitting apparatus, a receiving apparatus and communication methods related to a communication mechanism for a base station (gNB)-based scheduling mode in New Radio (NR).

2. Description of the Related Art

In Long Term Evolution (LTE) Vehicle to Everything (V2X), two modes have been specified for scheduling resources, one of which is an eNB scheduling-based mode and the other is a user equipment (UE) autonomous-based mode.

On the other hand, in NR V2X, mode 1 for scheduling resources where resources are scheduled by a base station (gNB) has been agreed. So far, it is still under discussion about a communication mechanism for this gNB-based scheduling mode.

SUMMARY

One non-limiting and exemplary embodiment facilitates a communication mechanism for the gNB-based scheduling mode in NR V2X.

In an embodiment, there is provided a transmitting apparatus, comprising: a receiver, operative to receive, from a base station, first control information for sidelink communication between the transmitting apparatus and a receiving apparatus; and a transmitter, operative to transmit a physical sidelink shared channel to the receiving apparatus according to the first control information, wherein the transmitter is operative not to transmit a first physical sidelink control channel to the receiving apparatus, or the transmitter is operative to transmit the first physical sidelink control channel with second control information to the receiving apparatus.

In an embodiment, there is provided a receiving apparatus, comprising: a transceiver, operative to receive, from a transmitting apparatus, a physical sidelink shared channel; and circuitry, operative to decode the physical sidelink shared channel, wherein the transceiver being further operative to receive, from a base station, first control information for decoding the physical sidelink shared channel, or the transceiver being further operative to receive, from the base station, the first control information and receive, from the transmitting apparatus, second control information via a first physical sidelink control channel.

In an embodiment, there is provided a communicating method, comprising: receiving, by a transmitting apparatus, from a base station, first control information for sidelink communication between the transmitting apparatus and a receiving apparatus; and transmitting, by the transmitting apparatus, a physical sidelink shared channel to the receiving apparatus according to the first control information, and not transmitting a first physical sidelink control channel to the receiving apparatus, or transmitting, by the transmitting apparatus, the physical sidelink shared channel to the receiving apparatus according to the first control information, and transmit the first physical sidelink control channel with second control information to the receiving apparatus.

In an embodiment, there is provided a communicating method, comprising: receiving, by a receiving apparatus, from a base station, first control information for decoding a physical sidelink shared channel; receiving, by the receiving apparatus, the physical sidelink shared channel from the transmitting apparatus and not receiving a first physical sidelink control channel from the transmitting apparatus, or receiving, from the transmitting apparatus, the physical sidelink shared channel and the first physical sidelink control channel with second control information; and decoding, by the receiving apparatus, the physical sidelink shared channel.

In an embodiment, there is provided a base station apparatus, comprising: circuitry, operative to generate first control information for sidelink communication between a transmitting apparatus and a receiving apparatus; and a transceiver, operative to transmit the first control information to the transmitting apparatus and the receiving apparatus, wherein the sidelink communication comprises transmitting a physical sidelink shared channel, or comprises transmitting the physical sidelink shared channel and a first physical sidelink control channel with second control information.

In an embodiment, there is provided a communicating method, comprising: generating, by a base station, first control information for sidelink communication between a transmitting apparatus and a receiving apparatus; and transmitting, by the base station, the first control information to the transmitting apparatus and the receiving apparatus, wherein the sidelink communication comprises transmitting a physical sidelink shared channel, or comprises transmitting the physical sidelink shared channel and a first physical sidelink control channel with second control information.

One non-limiting and exemplary embodiment facilitates a feedback mechanism from a receiving apparatus to a gNB for sidelink communication.

In an embodiment, there is provided a receiving apparatus, comprising: a receiver, operative to receive sidelink transmission from a transmitting apparatus; and a transmitter, operative to transmit sidelink HARQ feedback information to a gNB.

In an embodiment, there is provided a transmitting apparatus, comprising: circuitry, operative to generate a sidelink signal for sidelink transmission; and a transceiver, operative to perform the sidelink transmission to a receiving apparatus, wherein the receiving apparatus is operative to transmit sidelink HARQ feedback information to a gNB after receiving the sidelink transmission from the transmitting apparatus.

In an embodiment, there is provided a base station, comprising: a transceiver, operative to receive sidelink HARQ feedback information from a receiving apparatus; and circuitry, operative to process the received sidelink HARQ feedback information, wherein the sidelink HARQ feedback information is transmitted after the receiving apparatus receives sidelink transmission from a transmitting apparatus.

In an embodiment, there is provided a communicating method for a receiving apparatus, comprising: receiving, by the receiving apparatus, sidelink transmission from a transmitting apparatus; and transmitting, by the receiving apparatus, sidelink HARQ feedback information to a gNB.

In an embodiment, there is provided a communicating method for a transmitting apparatus, comprising: generating, by the transmitting apparatus, a sidelink signal for sidelink transmission; and performing, by the transmitting apparatus, the sidelink transmission to a receiving apparatus, wherein sidelink HARQ feedback information is transmitted from the receiving apparatus to a gNB after the sidelink transmission is received by the receiving apparatus.

In an embodiment, there is provided a communicating method for a base station, comprising: receiving, by the base station, sidelink HARQ feedback information from a receiving apparatus; and processing, by the base station, the received sidelink HARQ feedback information, wherein the sidelink HARQ feedback information is transmitted after the receiving apparatus receives sidelink transmission from a transmitting apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
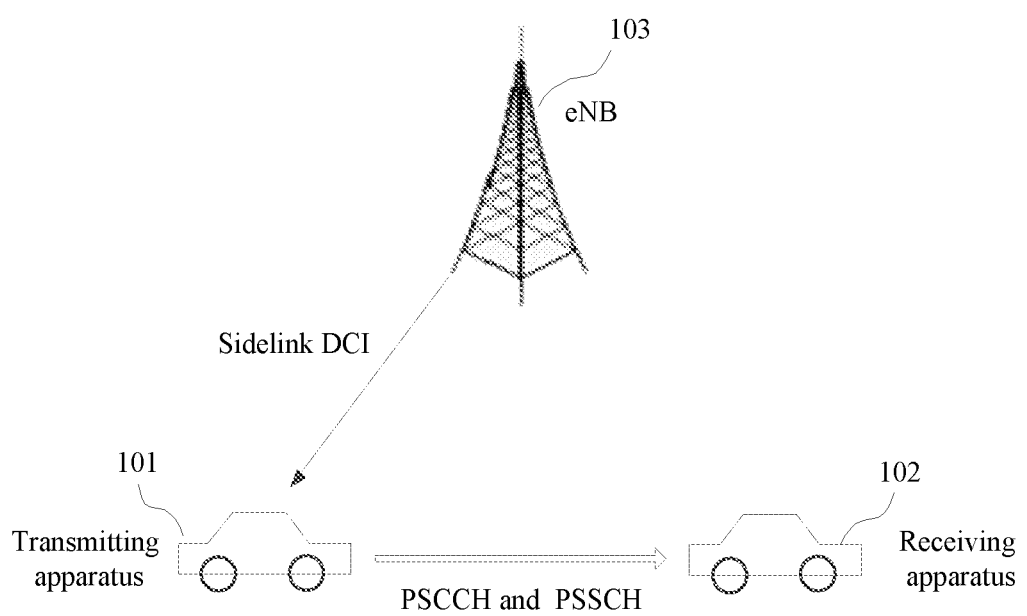
FIG. 1 schematically shows an exemplary communication scenario for an eNB scheduling-based mode in LTE V2X.

In the following detailed description, reference is made to the accompanying drawings, which form a part thereof. In the drawings, similar symbols typically identify similar components, unless context dictates otherwise. It will be understood that the aspects of the present disclosure can be arranged, substituted, combined, and designed in a wide variety of different configurations, all of which are explicitly contemplated and make part of this disclosure.

FIG. 1 schematically shows an exemplary communication scenario for an eNB scheduling-based mode in LTE V2X. As shown in FIG. 1, sidelink communication is performed between a transmitting apparatus 101 and a receiving apparatus 102, and resources for the sidelink communication is scheduled by an eNB 103. It should be noted that, although only one receiving apparatus is shown in FIG. 1, that is only for illustrative purposes, and any other number of receiving apparatuses are also available depending on practical application requirement.

The communication scenario shown in FIG. 1 requires that at least the transmitting apparatus 101 is in RRC_CO-NNECTED status with the eNB 103. The transmitting apparatus 101 may receive, from the eNB 103 via Uu, a DCI (Downlink Control Information) on scheduling resources for sidelink transmission, i.e., a sidelink DCI. After receiving the sidelink DCI, the transmitting apparatus 101 may perform the sidelink transmission, for example, including a PSCCH and a PSSCH, to the receiving apparatus(es) 102 according to the sidelink DCI. In order to enable the receiving apparatus(es) 102 to decode the PSSCH, the PSCCH should carry control signaling similar to the sidelink DCI to inform the receiving apparatus(es) 102 of scheduling decisions performed by the eNB 103.

As a result, for one packet transmission between the transmitting apparatus 101 and the receiving apparatus(es) 102, similar control signaling needs to be transmitted twice: one is the sidelink DCI from the eNB 103 to the transmitting apparatus 101, and the other one is the PSCCH from the transmitting apparatus 101 to the receiving apparatus(es) 102. Therefore, the control signaling overhead is large and redundant for sidelink resource assignment in the eNB scheduling-based mode in LTE V2X.

So far, sidelink discussion in NR is still in a very initial phase, and it is still under discussion about a communication mechanism for a gNB-based scheduling mode in NR V2X.

Figure 2:
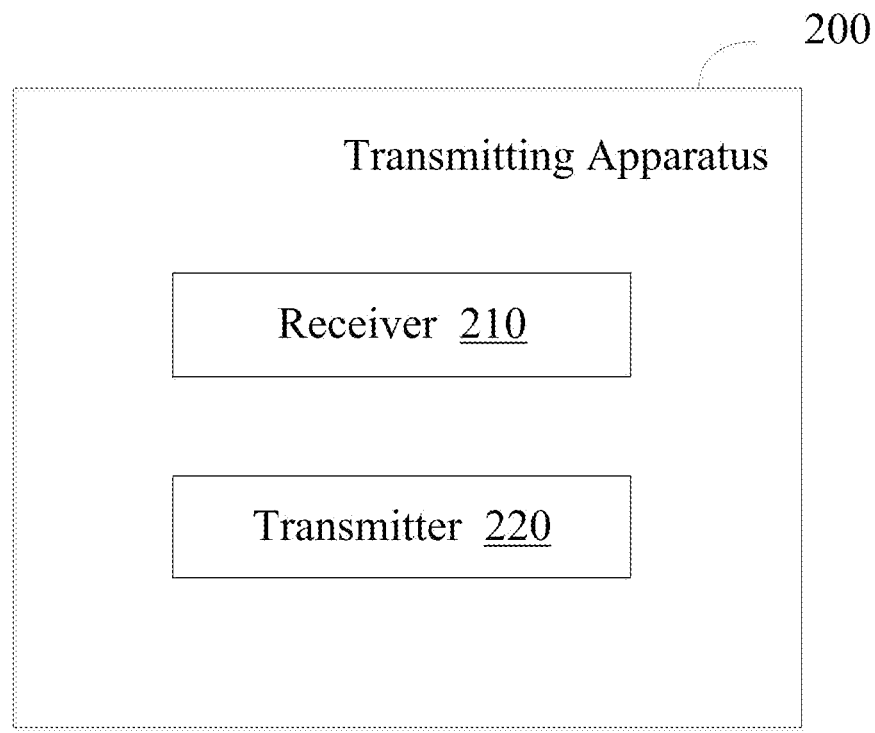
FIG. 2 illustrates a block diagram of a part of a transmitting apparatus 200 according to an embodiment of the present disclosure.

In an embodiment of the present disclosure, there is provided a transmitting apparatus for sidelink communication in NR V2X. FIG. 2 illustrates a block diagram of a part of a transmitting apparatus 200 according to an embodiment of the present disclosure.

As shown in FIG. 2, the transmitting apparatus 200 may include a receiver 210 and a transmitter 220. It should be noted that, the receiver 210 and the transmitter 220 disclosed in FIG. 2 are exemplary but not limited. That is, the transmitting apparatus 200 may include more or less structural or functional elements, or variations of the elements recited in FIG. 2. For example, the transmitting apparatus 200 may further include a control circuitry. Alternatively, the transmitting apparatus 200 may include a transceiver instead of the receiver 210 and the transmitter 220.

The receiver 210 may receive, from a base station, first control information for sidelink communication between the transmitting apparatus 200 and a receiving apparatus. The transmitter 220 may transmit a physical sidelink shared channel to the receiving apparatus according to the first control information. In an embodiment, the transmitter 220 may not transmit a first physical sidelink control channel to the receiving apparatus. Alternatively, the transmitter 220 may transmit the first physical sidelink control channel with second control information to the receiving apparatus.

In an embodiment, the transmitting apparatus 200 may further comprise a control circuitry, operative to monitor the first control information from the base station and control the sidelink communication according to the first control information. The monitoring implies attempting to decode each control channel in a set of control channel candidates.

Figure 3:
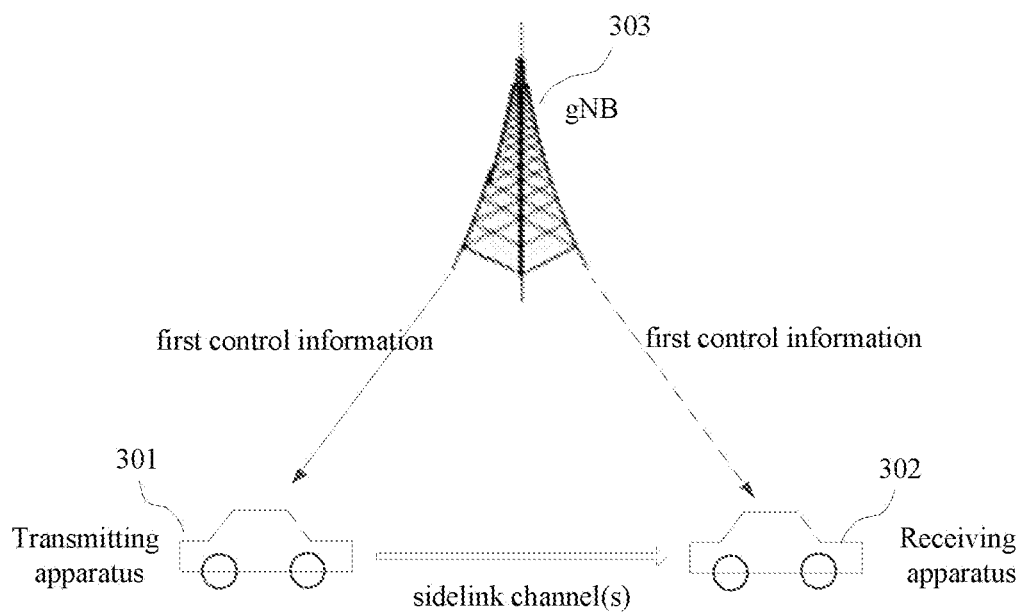
FIG. 3 schematically shows an exemplary communication scenario for a gNB scheduling-based mode in NR V2X according to an embodiment of the present disclosure.

In order to facilitate understanding of operations of the transmitting apparatus 200, FIG. 3 schematically shows an exemplary communication scenario for the gNB scheduling-based mode in NR V2X according to an embodiment of the present disclosure. As shown in FIG. 3, sidelink communication is performed between a transmitting apparatus 301 and a receiving apparatus 302, and resources for the sidelink communication is scheduled by a gNB 303.

For example, the transmitting apparatus 301 shown in FIG. 3 may function as the transmitting apparatus 200 as shown in FIG. 2, and the receiving apparatus 302 shown in FIG. 3 may function as the receiving apparatus which communicates with the transmitting apparatus 200 via sidelink. The operations of the transmitting apparatus 200 shown in FIG. 2, i.e., the transmitting apparatus 301 will be described below with reference to FIG. 3.

It should be noted that, although only one receiving apparatus is shown in FIG. 3, that is only for illustrative purposes, and any other number of receiving apparatuses are also available depending on practical application requirement. In other words, the sidelink communication between the transmitting apparatus 301 and at least one receiving apparatus 302 may be a unicast transmission, a groupcast transmission, or a broadcast transmission, and each of the at least one receiving apparatus 302 behaves the same.

It should also be noted that, although only one gNB 303 is shown in FIG. 3, that is only for illustrative purposes, and any other number of gNBs are also available depending on practical application requirement. In other words, the embodiments of the present disclosure may be applicable to not only a same cell, but also multiple cells as long as the transmitting apparatus 301 and the at least one receiving apparatus 302 can receive the same or similar control information on sidelink resource assignment scheduled by gNB(s).

In the following detailed description, the exemplary communication scenario for the gNB scheduling-based mode in NR V2X shown in FIG. 3 is described taking a sidelink communication performed in a same cell and between one transmitting apparatus and one receiving apparatus as an example.

As shown in FIG. 3, in a case of the transmitting apparatus 301 and the receiving apparatus 302 located in the same cell, firstly, the gNB 303 may transmit the first control information on scheduling of sidelink resources between the transmitting apparatus 301 and the receiving apparatus 302. Both the transmitting apparatus 301 and the receiving apparatus 302 may monitor the same first control information. Alternatively, in another embodiment, the first control information transmitted from the gNB 303 to the transmitting apparatus 301 may not be completely the same as the first control information transmitted from the gNB 303 to the receiving apparatus 302. In other words, the first control information transmitted from the gNB 303 to the transmitting apparatus 301 may be similar to the first control information transmitted from the gNB 303 to the receiving apparatus 302. For example, a portion, but not all, of contents of the first control information transmitted from the gNB 303 to the transmitting apparatus 301 is the same as that of the first control information transmitted from the gNB 303 to the receiving apparatus 302.

As shown in FIG. 3, the transmitting apparatus 301 may monitor the first control information from the gNB 303, and then transmit sidelink channel(s) to the receiving apparatus 302 according to the received first control information. On the other hand, the receiving apparatus 302 may monitor the first control information from the gNB 303, and then receive the sidelink channel(s) from the transmitting apparatus 301.

According to one embodiment of the present disclosure, the sidelink channel(s) may comprise the physical sidelink shared channel but not comprise the first physical sidelink control channel. In other words, the transmitter 220 of the transmitting apparatus 301 may not transmit the first physical sidelink control channel to the receiving apparatus 302. In an example, the physical sidelink shared channel may be a PSSCH, and the first physical sidelink control channel may be a first PSCCH between the transmitting apparatus 301 and the receiving apparatus 302.

It should be noted that, a PSCCH between the transmitting apparatus 301 and the receiving apparatus 302 is called as the first PSCCH, for the purpose of distinguishing from a PSCCH between the gNB 303 and any terminal apparatus(es) communicating with the gNB 303 (also called as a second PSCCH) that will be described in detail later. Although the terms "first" and "second" are used herein to describe different physical sidelink control channels, these terms are only used to distinguish one PSCCH from another PSCCH, and not intend to limit or change the characteristics of the PSCCH. Advantageously, according to the embodiments of the present disclosure, the PSCCH is not limited to being transmitted between terminal apparatuses, but can be extended to be transmitted between the gNB and respective terminal apparatuses.

Figure 4A:
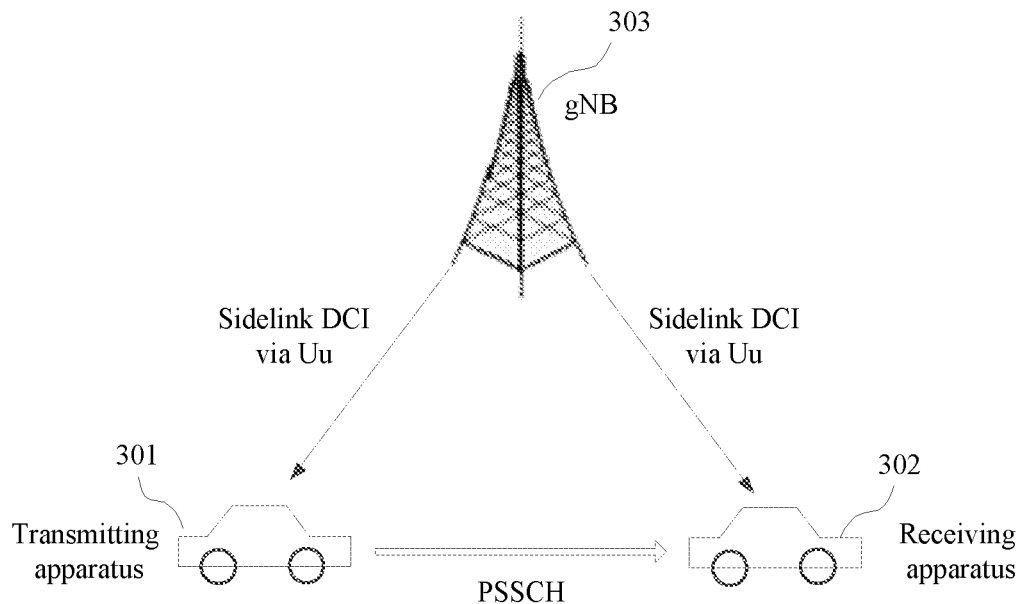
FIGS. 4A and 4B schematically show exemplary communication scenarios of transmitting a PSSCH (Physical Sidelink Shared Channel) in the gNB scheduling-based mode according to embodiments of the present disclosure.
Figure 4B:
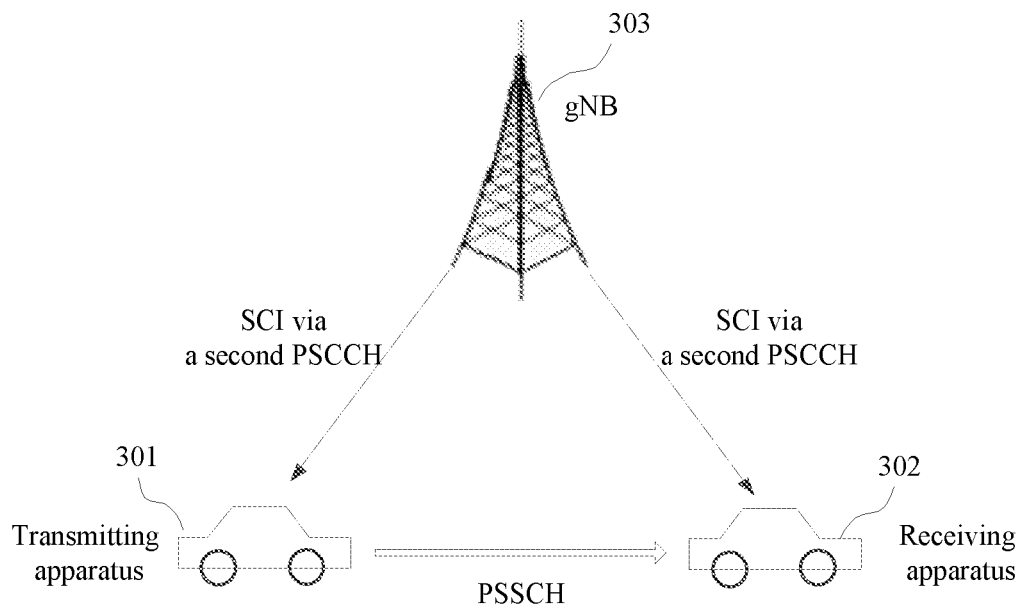

FIGS. 4A and 4B schematically show exemplary communication scenarios of transmitting the PSSCH in the gNB scheduling-based mode according to embodiments of the present disclosure. The same reference numbers are used in FIGS. 4A and 4B for indicating the same elements as shown in FIG. 3. As shown in FIGS. 4A and 4B, the transmitting apparatus 301 and the receiving apparatus 302 may receive the same first control information, for example, a sidelink DCI as shown in FIG. 4A or a SCI (Sidelink Control Information) as shown in FIG. 4B which will be described in detail later, from the gNB 303. Next, the transmitting apparatus 301 may transmit the PSSCH but not the first PSCCH to the receiving apparatus 302, after decoding the first control information. As a result, in FIG. 4A, control signaling for scheduling the PSSCH comprises the sidelink DCI transmitted by the gNB 303; and in FIG. 4B, the control signaling for scheduling the PSSCH comprises the SCI transmitted by the gNB 303.

Advantageously, compare to the eNB scheduling-based mode in LTE V2X, control signaling overhead for sidelink resource assignment in the gNB scheduling-based mode in NR V2X can be reduced, due to no transmission of a PSCCH from a transmitting apparatus to a receiving apparatus.

Alternatively, according to another embodiment of the present disclosure, the sidelink channel(s) may comprise both the PSSCH and the first PSCCH carrying the second control information. In other words, the transmitter 220 of the transmitting apparatus 301 may transmit the first PSCCH carrying the second control information and the PSSCH to the receiving apparatus 302. The second control information transmitted by the transmitting apparatus 301 is different from the first control information transmitted by the gNB 303.

Figure 5A:
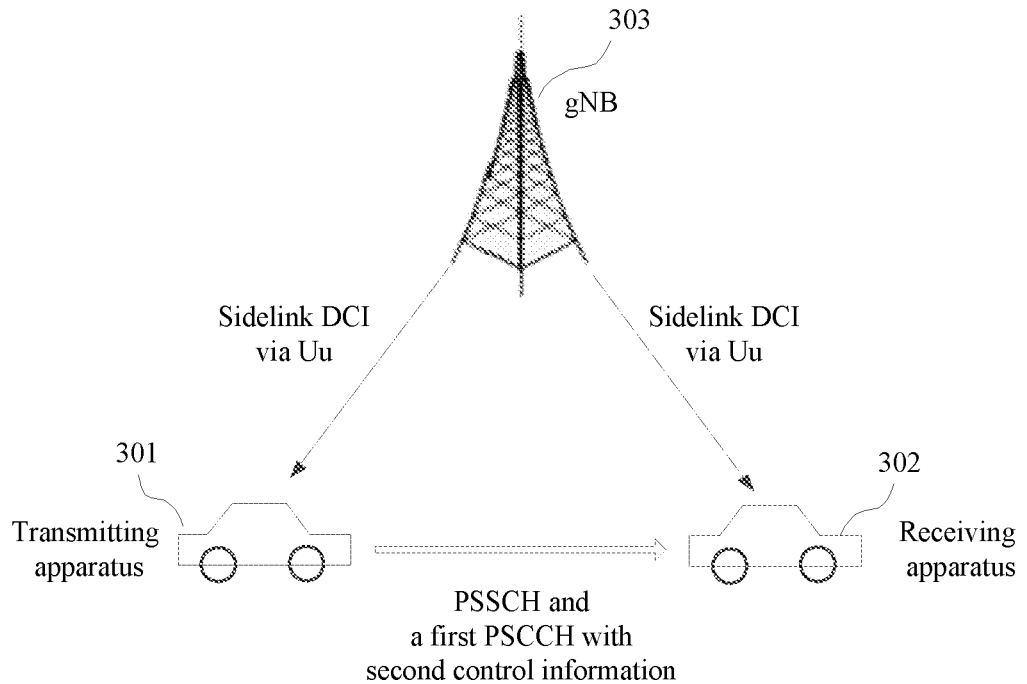
FIGS. 5A and 5B schematically show exemplary communication scenarios of transmitting the PSSCH and a first PSCCH (Physical Sidelink Control Channel) in the gNB scheduling-based mode according to embodiments of the present disclosure.
Figure 5B:
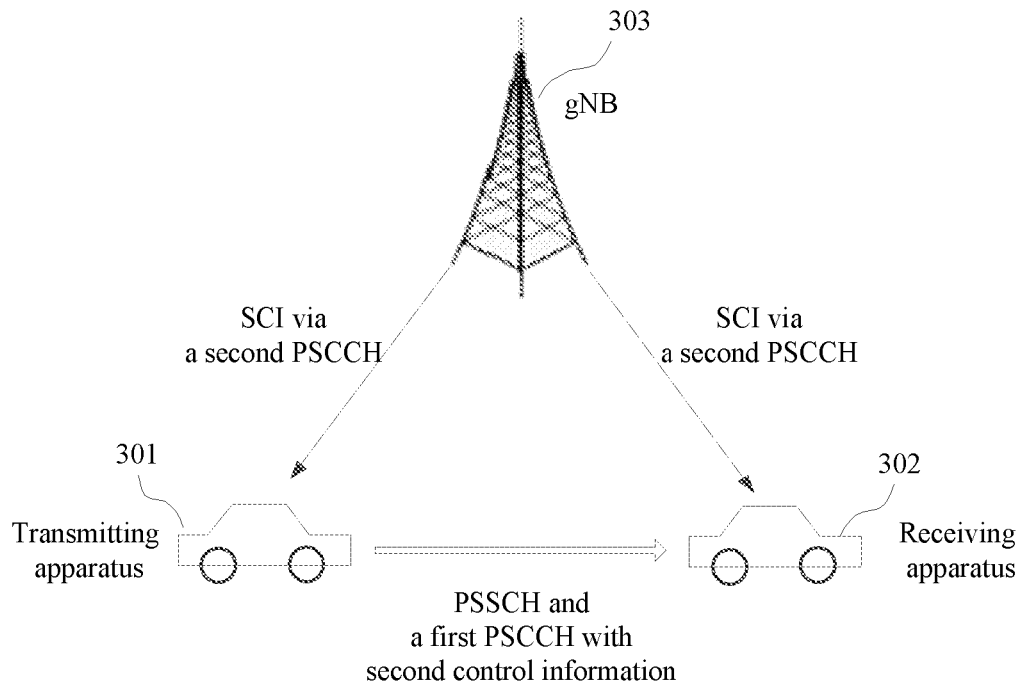

FIGS. 5A and 5B schematically show exemplary communication scenarios of transmitting the PSSCH and a first PSCCH in the gNB scheduling-based mode according to embodiments of the present disclosure. The same reference numbers are used in FIGS. 5A and 5B for indicating the same elements as shown in FIG. 3. As shown in FIGS. 5A and 5B, the transmitting apparatus 301 and the receiving apparatus 302 may receive the same first control information, for example, the sidelink DCI as shown in FIG. 5A or the SCI (Sidelink Control Information) as shown in FIG. 5B which will be described in detail later, from the gNB 303. Next, the transmitting apparatus 301 may transmits the PSSCH together with the first PSCCH which carries the second control information to the receiving apparatus 302, after decoding the first control information.

In an embodiment, the first control information may comprise at least an identification of the transmitting apparatus 301, an identification of the receiving apparatus 302, and Modulation Coding Scheme (MCS) for the PSSCH between the transmitting apparatus 301 and the receiving apparatus 302. The identification of the transmitting apparatus 301/receiving apparatus 302 is used to identify whether certain first control information is targeted for this transmitting apparatus 301/receiving apparatus 302. The MCS indicates the modulation coding scheme to be used by the transmitting apparatus 301 to transmit the PSSCH. In an embodiment, any one or all of the above mentioned content contained in the first control information may be transmitted explicitly or implicitly.

In a case of a unicast transmission between one transmitting apparatus 301 and one receiving apparatus 302, the identification of the one transmitting apparatus 301 and the identification of the one receiving apparatus 302 are included in the first control information. Thereby, both the transmitting apparatus 301 and the receiving apparatus 302 know whether to receive certain first control information transmitted from the gNB. In other words, the identification of the transmitting apparatus 301 is used for a reception of the first control information in the transmitting apparatus 301, and the identification of the receiving apparatus 302 is used for a reception of the first control information in the receiving apparatus 302.

In a case of a groupcast transmission between one transmitting apparatus 301 and a group of receiving apparatuses 302, the identification of the transmitting apparatus 301 and a group identification of the group of receiving apparatuses 302 are included in the first control information. Thereby, the transmitting apparatus 301 and all receiving apparatuses 302 in the group of receiving apparatuses 302 know whether to receive certain first control information transmitted from the gNB. In other words, the identification of the transmitting apparatus 301 is used for a reception of the first control information in the transmitting apparatus 301, and the group identification of the group of receiving apparatuses 302 is used for a reception of the first control information in all receiving apparatuses 302 in the group of receiving apparatuses 302.

In an example, the first control information may further comprise resource allocation of the PSSCH. In another example, the first control information may further comprise a transmission power value of the PSSCH. In another example, the first control information may further comprise any other control information for the sidelink communication between the transmitting apparatus 301 and the receiving apparatus 302. In another example, the first control information may further comprise any suitable combination of the above mentioned information.

In an embodiment, the second control information may not comprise at least the transmission power value of the PSSCH. Since the transmission power value of the PSSCH is not useful for the receiving apparatus 302, it does not need to be transmitted to the receiving apparatus 302. Alternatively, the second control information may not comprise the transmission power value of the PSSCH and other content contained in the first control information, for example, the identification of the transmitting apparatus 301.

In an example, the second control information may comprise the identification of the transmitting apparatus 301, the identification of the receiving apparatus 302, and the MCS for the PSSCH. In another example, the second control information may comprise the identification of the receiving apparatus 302 and the MCS for the PSSCH, but not the identification of the transmitting apparatus 301, since the second control information is transmitted from the transmitting apparatus 301. In an embodiment, any one or all of the above mentioned content contained in the second control information may be transmitted explicitly or implicitly.

It should be noted that, the examples for the first control information and the examples for the second control information described above are only for illustrative purposes, and the present disclosure is not limited thereto. Other examples for the first control information and the second control information can be configured depending on specific requirements, as long as the second control information comprises simplified or reduced contents compared to the traditional PSCCH from the transmitting apparatus 101 to the receiving apparatus 102 as in the LTE V2X scenario shown in FIG. 1, so that size of the first PSCCH carrying the second control information can be reduced.

As can be seen from FIG. 5A, the control signaling for scheduling the PSSCH comprises the sidelink DCI transmitted by the gNB 303, and the first PSCCH transmitted by the transmitting apparatus 301 and carrying the second control information with simplified or reduced contents. As can be seen from FIG. 5B, the control signaling for scheduling the PSSCH comprises the SCI transmitted by the gNB 303, and the first PSCCH transmitted by the transmitting apparatus 301 and carrying the second control information with simplified or reduced contents.

Advantageously, compare to the eNB scheduling-based mode in LTE V2X, control signaling overhead for sidelink resource assignment in the gNB scheduling-based mode in NR V2X can be reduced, due to transmission of a PSCCH with simplified or reduced information from a transmitting apparatus to a receiving apparatus.

In an embodiment, in the case of the sidelink channel(s) comprising the PSSCH but not the first PSCCH, for example, shown in FIGS. 4A and 4B, the receiving apparatus 302 may decode the PSSCH using the received and decoded first control information, In an embodiment, in the case of the sidelink channel(s) comprising both the PSSCH and the first PSCCH carrying the second control information, for example, shown in FIGS. 5A and 5B, when the first control information is received from the gNB 303 and the second control information is received from the transmitting apparatus 301, the receiving apparatus 302 may decode the PSSCH using any one of the first control information and the second control information without comparing the first control information and the second control information. Alternatively, the receiving apparatus 302 may compare the first control information and the second control information, and decode the PSSCH using one of the first control information and the second control information if the first control information is consistent with the second control information. Alternatively, the receiving apparatus 302 may compare the first control information and the second control information, and not decode the PSSCH if the first control information is not consistent with the second control information.

Advantageously, the reliability of the control signaling for sidelink communication received by a receiving apparatus can be improved due to receiving the control signaling twice at the receiving apparatus.

Hereinafter, specific examples of the first control information will be described in detail with reference to FIGS. 4A to 5B.

According to one embodiment of the present disclosure, the first control information may be transmitted in a physical downlink control channel between the gNB 303 and any terminal apparatus communicating with the gNB 303, wherein said any terminal apparatus includes the transmitting apparatus 301 and the receiving apparatus 302. For example, as shown in FIGS. 4A and 5A, the first control information may be a sidelink DCI carried on a PDCCH (Physical Downlink Control Channel) or an EPDCCH (Enhanced Physical Downlink Control Channel) transmitted via Uu.

In this case, the sidelink DCI may comprise, for example, an ID of the transmitting apparatus 301, an ID of the receiving apparatus 302, and the MCS. In an example, the sidelink DCI may further comprise resource allocation of the PSSCH. In another example, the sidelink DCI may further comprise a transmission power value of the PSSCH. In another example, the sidelink DCI may further comprise any other control information for the sidelink communication between the transmitting apparatus 301 and the receiving apparatus 302. Alternatively, the sidelink DCI may further comprise any suitable combination of the above mentioned information.

As shown in FIGS. 4A and 5A, the sidelink DCI is received by the transmitting apparatus 301 and the receiving apparatus 302. In other words, both the transmitting apparatus 301 and the receiving apparatus 302 may monitor the sidelink DCI for sidelink communication in the gNB-based scheduling mode.

Alternatively, according to another embodiment of the present disclosure, the first control information may be transmitted in a physical sidelink control channel between the gNB 303 and any terminal apparatus communicating with the gNB 303 (also called as a second physical sidelink control channel), wherein said any terminal apparatus includes the transmitting apparatus 301 and the receiving apparatus 302. For example, as shown in FIGS. 4B and 5B, the first control information may be a SCI carried on a PSCCH between the gNB 303 and any terminal apparatus communicating with the gNB 303 (also called as the second PSCCH).

In this case, the SCI carried on the second PSCCH may comprise, for example, an ID of the transmitting apparatus 301, an ID of the receiving apparatus 302, and the MCS. In an example, the SCI may further comprise resource allocation of the PSSCH. In another example, the SCI may further comprise a transmission power value of the PSSCH. In another example, the SCI may further comprise any other control information for the sidelink communication between the transmitting apparatus 301 and the receiving apparatus 302. Alternatively, the SCI may further comprise any suitable combination of the above mentioned information.

As shown in FIGS. 4B and 5B, the SCI is received by the transmitting apparatus 301 and the receiving apparatus 302. In other words, both the transmitting apparatus 301 and the receiving apparatus 302 may monitor the SCI for sidelink communication in the gNB-based scheduling mode.

Figure 6:
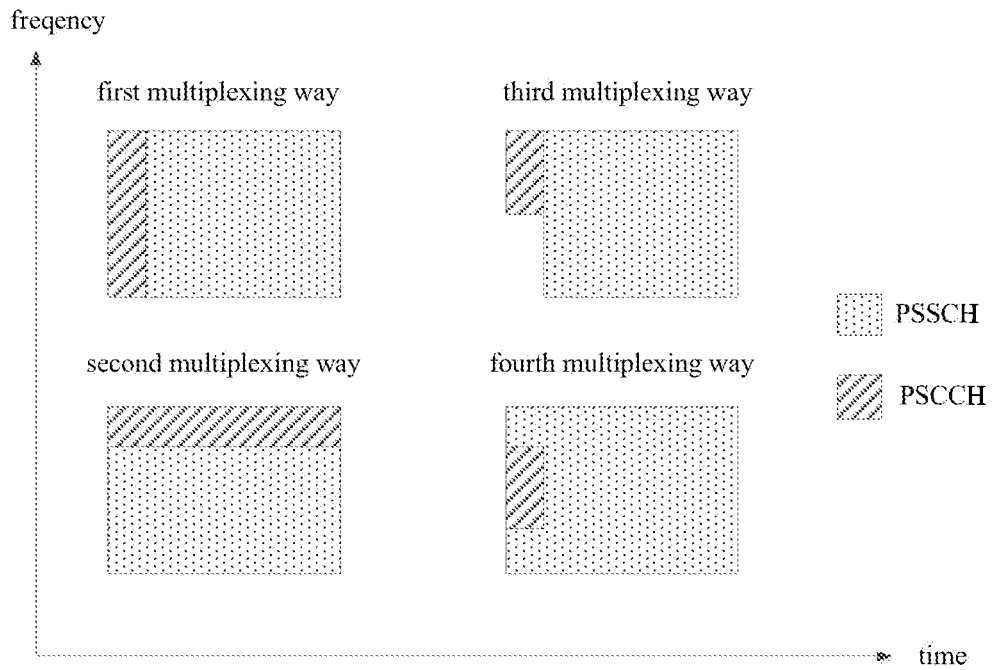
FIG. 6 schematically shows exemplary configurations for multiplexing a PSSCH and a PSCCH in the gNB scheduling-based mode according to embodiments of the present disclosure.

FIG. 6 schematically shows exemplary configurations for multiplexing a PSSCH and a PSCCH in the gNB scheduling-based mode according to embodiments of the present disclosure. Four different multiplexing ways have been shown in FIG. 6.

In the case of the sidelink channel(s) comprising the PSSCH but not the first PSCCH, for example, shown in FIGS. 4A and 4B, the PSCCH as shown in FIG. 6 may be the second PSCCH between the gNB 303 and any terminal apparatus(es) communicating with the gNB 303 including the transmitting apparatus 301 and the receiving apparatus 302.

In the case of the sidelink channel(s) comprising both the PSSCH and the first PSCCH carrying the second control information, for example, shown in FIGS. 5A and 5B, the PSCCH as shown in FIG. 6 may be an accumulation of the second PSCCH between the gNB 303 and any terminal apparatus(es) and the first PSCCH between the transmitting apparatus 301 and the receiving apparatus 302. It should be noted that, such accumulation of the first PSCCH and the second PSCCH is from the view of the receiving apparatus 302, but does not change or affect the transmission operations performed separately by the gNB 303 and the transmitting apparatus 301. For example, from the view of the receiving apparatus 302, such accumulation may mean an increase in terms of signal strength of the received control channels including the first PSCCH and the second PSCCH. From the views of the gNB 303 and the transmitting apparatus 301, they can transmit the first PSCCH or the second PSCCH, for example, in the same frequency domain and time domain.

In a first multiplexing way, the PSSCH and the PSCCH are Time-Division Multiplexed (TDMed) and occupy the same frequency band. In a second multiplexing way, the PSSCH and the PSCCH are Frequency-Division Multiplexed (FDMed).

In a third multiplexing way, the PSSCH and the PSCCH are TDMed and occupy different frequency bands. For example, the frequency band of the PSCCH is narrower than that of the PSSCH. It should be noted that, for the third multiplexing way, the position of the PSCCH in the frequency domain may be aligned with that of the PSSCH (shown in FIG. 6), or may not be aligned with that of the PSSCH (not shown in FIG. 6). Further, the PSCCH and the PSSCH may be or may not be adjacent in the time domain.

In a fourth multiplexing way, the starting position of the PSCCH in the time domain is the same as that of the PSSCH while the ending position of the PSCCH in the time domain is earlier than that of the PSSCH, and the frequency band occupied by the PSCCH totally falls in the frequency band occupied by the PSSCH. It should be noted that, for the fourth multiplexing way, the position of the PSCCH in the frequency domain may be aligned with that of the PSSCH (not shown in FIG. 6), or may not be aligned with that of the PSSCH (shown in FIG. 6).

In order to achieve multiplexing from the view of the receiving transmitting 302, for the second and the fourth multiplexing ways, it needs some coordination between the transmitting apparatus 301 and the gNB 303. For example, some of the resource occupied by the PSSCH transmitted by the transmitting apparatus 301 may be punctured or rate-matched for the second PSCCH transmitted by the gNB 303.

For all the above four multiplexing ways, a reference signal used for demodulating the second PSCCH is different from a reference signal used for demodulating the PSSCH, due to different radio transmission paths one of which is a path from a gNB to terminal apparatus(es) and the other one is a path from a transmitting apparatus to a receiving apparatus. For example, the reference signal may be Demodulation Reference Signal (DMRS). In other words, the DMRS is not shared between the second PSCCH and the PSSCH.

Advantageously, in the case of transmitting a SCI by a gNB, a PSCCH is not limited to being transmitted between terminal apparatuses, but can be extended to be transmitted between the gNB and respective terminal apparatuses. A common design of a first PSCCH between terminal apparatuses and a second PSCCH between the gNB and respective terminal apparatuses can be achieved to save the standardization efforts. For example, the design can be common in terms of configuration of DMRS, resource mapping, encoding and so on.

In an embodiment, in the gNB-based scheduling mode, if sensing for resources is needed by a certain terminal apparatus communicating with the gNB, the certain terminal apparatus may perform the sensing based on monitoring the first control information transmitted by the gNB and associated PSSCH. Furthermore, the sensing results may be reported to the gNB for resource assignment. Alternatively, the sensing results may be used for resource assignment in a case of UE autonomous-based scheduling mode.

Referring back to FIG. 2, in an embodiment, transmitting apparatus 200 may further comprise circuitry, operative to control transmission power of the physical sidelink shared channel based on (1) path loss between the transmitting apparatus and the receiving apparatus, (2) geographical distance between the transmitting apparatus and the receiving apparatus, or (3) a configured value depending on a RRC signaling.

For example, in an example, transmission power of the PSSCH transmitted by the transmitting apparatus 301 shown in FIGS. 3 to 5B may be determined based on path loss between the transmitting apparatus 301 and the receiving apparatus 302. In another example, the transmission power of the PSSCH may be determined based on geographical distance between the transmitting apparatus 301 and the receiving apparatus 302. In a further example, the transmission power of the PSSCH may be determined based on a certain value that is configured, preconfigured or specified by an RRC signaling. It should be noted that, the above examples are only for illustrative purposes, and any other examples for determining the transmission power of the PSSCH are also available depending on practical application requirement.

Figure 7:
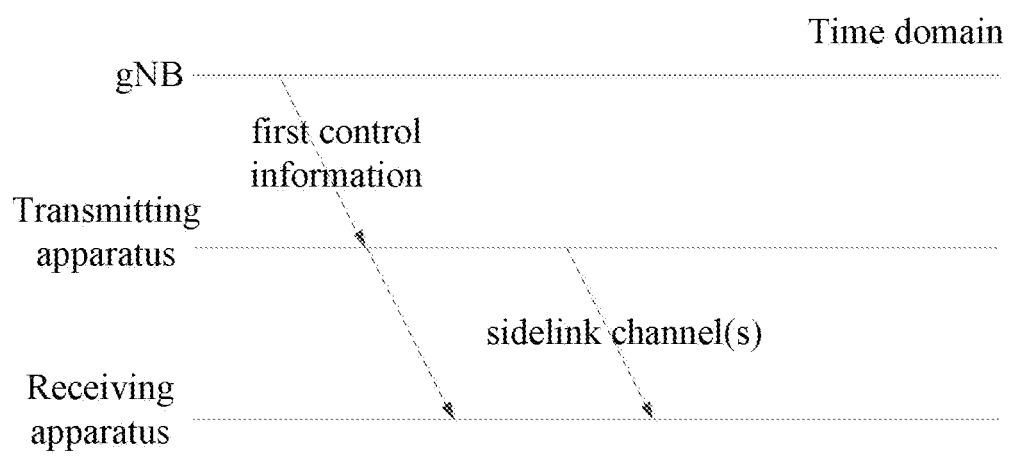
FIG. 7 schematically shows exemplary timings for first control information and sidelink channel(s) in the gNB scheduling-based mode according to embodiments of the present disclosure.

FIG. 7 schematically shows exemplary timings for the first control information and the sidelink channel(s) in the gNB scheduling-based mode according to embodiments of the present disclosure.

As shown in FIG. 7, a timing from transmission of the first control information to transmission of the sidelink channel(s), i.e., the PSSCH as shown in FIGS. 4A and 4B or the PSSCH and the first PSCCH as shown in FIGS. 5A and 5B, may be larger than a sum of a timing of decoding the first control information by the transmitting apparatus 301 and a timing of encoding the PSSCH by the transmitting apparatus 301. For example, the timing from transmission of the first control information to transmission of the sidelink channel(s) may be 4 slots.

In an embodiment, the timing from the transmission of the first control information to the transmission of the sidelink channel(s), for example the PSSCH, may be fixed, and not indicated in the first control information. Alternatively, the timing from the transmission of the first control information to the transmission of the sidelink channel(s), for example the PSSCH, may be flexible and indicated in the first control information, for example, may be indicated explicitly or implicitly.

As described above, the sidelink communication between the transmitting apparatus 301 and at least one receiving apparatus 302 may be a unicast transmission, a groupcast transmission, or a broadcast transmission. It should be noted that, although only one receiving apparatus is shown in FIGS. 3 to 5B, that is only for illustrative purposes, and any other number of receiving apparatuses are also available depending on practical application requirement. In other words, the sidelink communication may be performed between the transmitting apparatus 301 and at least one receiving apparatus 302, and each of the at least one receiving apparatus 302 behaves the same.

In an embodiment, in the case of broadcast transmission, no HARQ feedback information may be required from the receiving apparatus 302 to the gNB 303.

Figure 8:
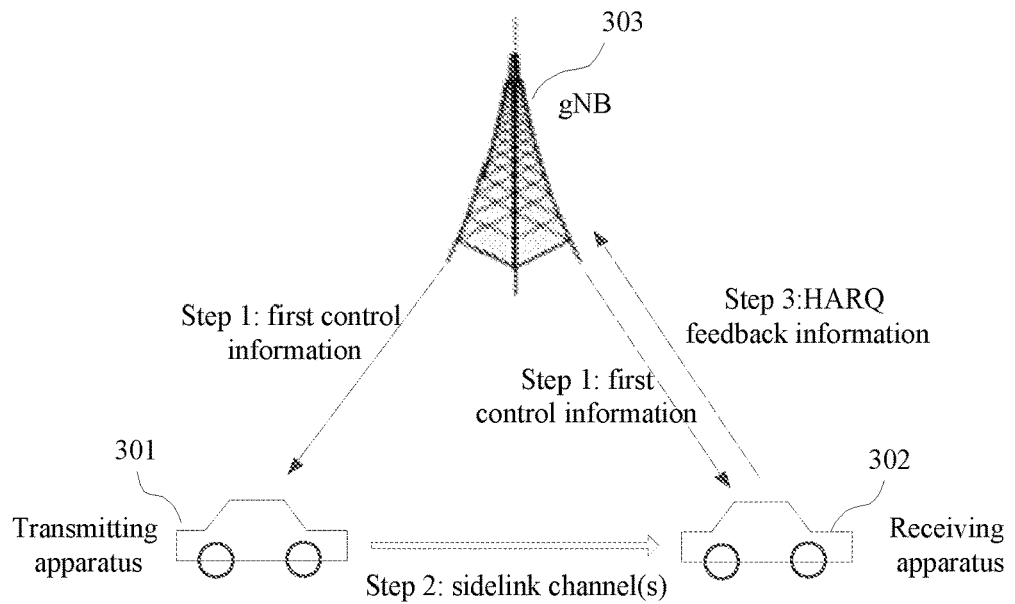
FIG. 8 schematically shows an exemplary Hybrid Automatic Repeat reQuest (HARQ) feedback scenario in the gNB scheduling-based mode according to an embodiment of the present disclosure.

In an embodiment, in the case of unicast transmission or groupcast transmission, HARQ feedback information may be required from the receiving apparatus 302 to the gNB 303. FIG. 8 schematically shows an exemplary HARQ feedback scenario in the gNB scheduling-based mode according to an embodiment of the present disclosure. The same reference numbers are used in FIG. 8 for indicating the same elements as shown in FIGS. 3 to 5B.

As shown in FIG. 8, firstly, the gNB 303 may transmit the first control information (for example, the sidelink DCI as shown in FIGS. 4A and 5A or the SCI as shown in FIGS. 4B and 5B) on scheduling of sidelink resources between the transmitting apparatus 301 and the receiving apparatus 302. The transmitting apparatus 301 may monitor the first control information from the gNB 303, and then transmit the sidelink channel(s) to the receiving apparatus 302 according to the received first control information. The sidelink channel(s) include the PSSCH but not the first PSCCH as shown in FIGS. 4A and 4B, or include both the PSSCH and the first PSCCH carrying the second control information as shown in FIGS. 5A and 5B. On the other hand, the receiving apparatus 302 may monitor the first control information from the gNB 303, and then receive the sidelink channel(s) from the transmitting apparatus 301. Next, the receiving apparatus 302 may transmit HARQ feedback information to the gNB 303 after receiving and decoding the sidelink channel(s), for example, at least the PSSCH, from the transmitting apparatus 301.

In an embodiment, the HARQ feedback information may be carried on a feedback channel between the gNB 303 and the receiving apparatus 302. In an example, the feedback channel may be a physical sidelink feedback channel, for example, a PSFCH (Physical Sidelink Feedback Channel). Alternatively, the feedback channel may be a physical uplink control channel, for example, a PUCCH (Physical Uplink Control Channel).

In an embodiment, transmission power of the feedback channel, for example, the PSFCH or the PUCCH, may be based on path loss between the gNB 303 and the receiving apparatus 302.

In an embodiment, the receiving apparatus 302 may acquire resource position for the PSFCH or the PUCCH, from at least one of the first control information transmitted by the gNB 303 and the second control information transmitted by the transmitting 301. In the case that the sidelink channel(s) include the PSSCH but not the first PSCCH as shown in FIGS. 4A and 4B, the gNB 303 may inform the receiving apparatus 302 HARQ feedback resource position in the first control information (for example, the sidelink DCI or the SCI). For example, the gNB 303 configures four resources (e.g., the PSFCH or the PUCCH) available to the receiving apparatus 302 for transmitting the HARQ feedback information, and indicates one of them to the receiving apparatus 302 by using, for example, 2 bits in the sidelink DCI or the SCI. Alternatively, in the case that the sidelink channel(s) include both the PSSCH and the first PSCCH carrying the second control information as shown in FIGS. 5A and 5B, the transmitting apparatus 301 may additionally inform the receiving apparatus 302 the HARQ feedback resource position in the second control information via the first PSCCH.

In an embodiment, the transmitting apparatus 301 may report some assistance information to the gNB 303, so that the gNB 303 may determine at least one of the MCS, the resource allocation, transmission power of the PSSCH and any other suitable control information for the sidelink communication. For example, the assistance information may comprise at least one of Channel State Information (CSI), traffic characteristics, geographical formation, channel measurement results and any other suitable information.

Figure 9:
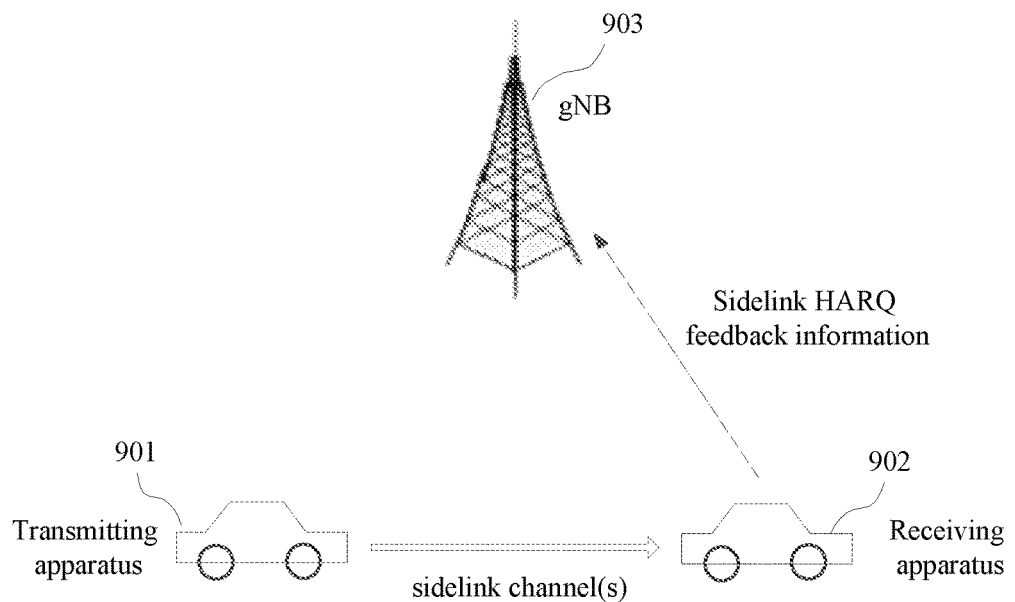
FIG. 9 schematically shows an exemplary HARQ feedback scenario in NR V2X according to an embodiment of the present disclosure.

According to another aspect of the present disclosure, FIG. 9 schematically shows an exemplary HARQ feedback scenario in NR V2X. As shown in FIG. 9, a sidelink communication is performed between a transmitting apparatus 901 and a receiving apparatus 902. At least the receiving apparatus 902 is in RRC_CONNECTED status with a gNB 903.

It should be noted that, although only one receiving apparatus 902 is shown in FIG. 9, that is only for illustrative purposes, and any other number of receiving apparatuses are also available depending on practical application requirement. In other words, the sidelink communication between the transmitting apparatus 901 and at least one receiving apparatus 902 may be a unicast transmission, a groupcast transmission, or a broadcast transmission, and each of the at least one receiving apparatus 902 behaves the same.

As shown in FIG. 9, the receiving apparatus 902 may directly transmit sidelink HARQ feedback information to the gNB 903 after receiving and decoding physical channel(s) for sidelink communication from the transmitting apparatus 901, regardless of what traffic is transmitted, how the transmitting apparatus 901 transmits the physical channel(s) to the receiving apparatus 902, and whether the gNB 903 transmits control information to the receiving apparatus 902 or not.

In an embodiment, the sidelink HARQ feedback information may be carried on a feedback channel between the gNB 903 and the receiving apparatus 902. In an example, the feedback channel may be a physical sidelink feedback channel, for example, a PSFCH. Alternatively, the feedback channel may be a physical uplink control channel, for example, a PUCCH.

In an embodiment, transmission power of the feedback channel, for example, the PSFCH or the PUCCH, may be based on path loss between the gNB 903 and the receiving apparatus 902.

In an embodiment, the receiving apparatus 902 may acquire resource position for the PSFCH or the PUCCH, from at least one of control information transmitted by the gNB 903 (if any) or control information transmitted by the transmitting apparatus 901 (if any).

Advantageously, the feedback mechanism from a receiving apparatus to a gNB enables the gNB to schedule retransmission based on HARQ feedback information received from the receiving apparatus.

Figure 10:
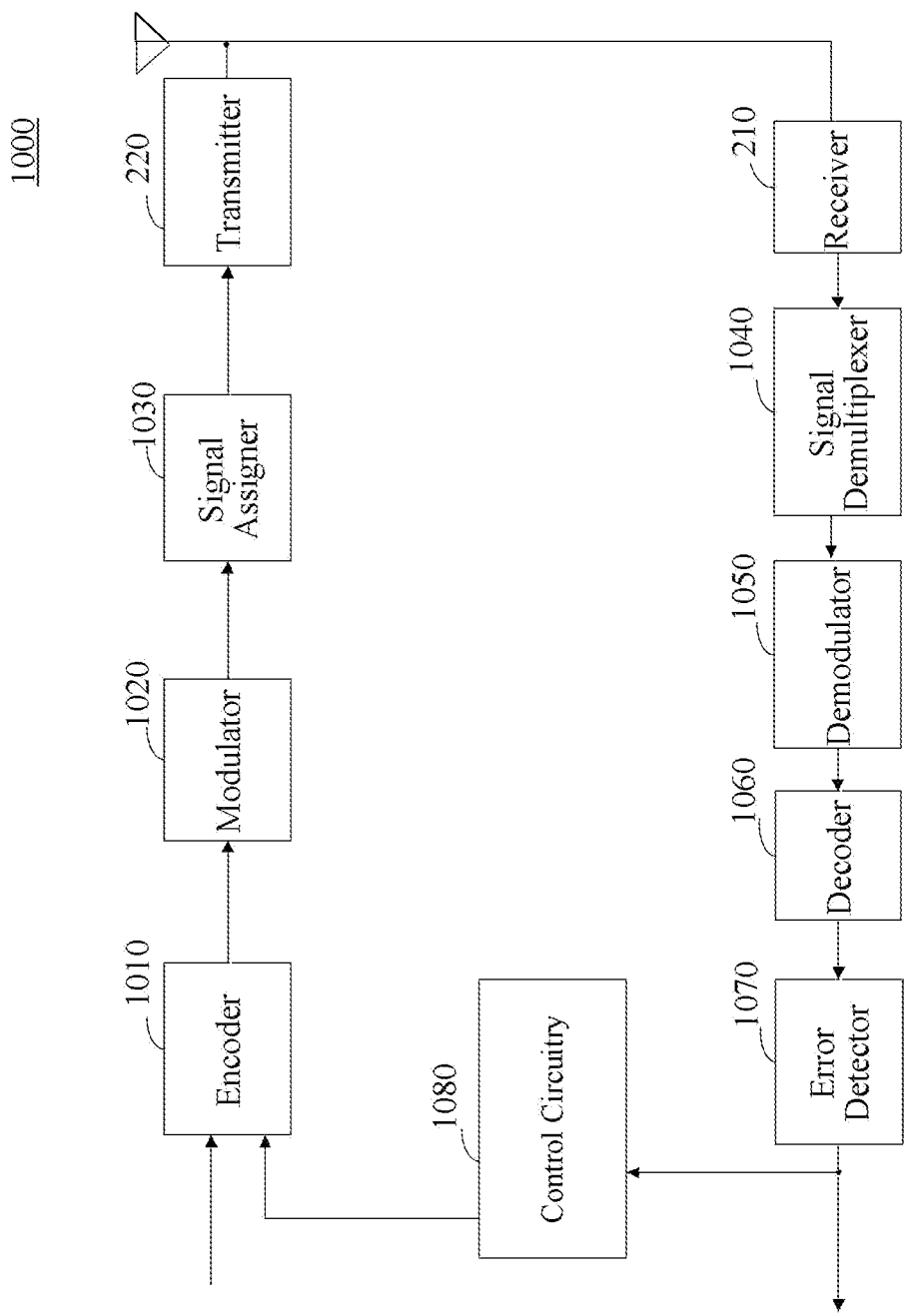
FIG. 10 schematically shows a detailed block diagram of a transmitting apparatus 1000 according to an embodiment of the present disclosure.

In another embodiment of the present disclosure, there is provided a transmitting apparatus as shown in FIG. 10. FIG. 10 schematically shows a detailed block diagram of a transmitting apparatus 1000 according to an embodiment of the present disclosure. As shown in FIG. 10, the transmitting apparatus 1000 includes an encoder 1010, a modulator 1020, a signal assigner 1030, a signal demultiplexer 1040, a demodulator 1050, a decoder 1060, an error detector 1070, a control circuitry 1080, the transmitter 220, and the receiver 210.

The same reference numbers are used in FIG. 10 for indicating the same elements as shown in FIG. 2. To avoid having the description become complex, in this case, the constituent elements related to the transmission of sidelink data, which are closely connected with the features of the present embodiment, are mainly shown.

The encoder 1010 may encode traffic to be transmitted to obtain the encoded signal, the modulator 1020 may modulate the encoded signal to obtain the modulated signal, the signal assigner 1030 may assign resources for the modulated signal according to an output result from the control circuitry 1080, and the transmitter 220 may transmit sidelink channel(s) carrying the modulated signal. The control circuitry 1080 may monitor control information output from the error detector 1070, and controls the transmission of the sidelink channel(s).

The receiver 210 may receive traffic from the antenna. The signal demultiplexer 1040 may demultiplex the received traffic by Fast Fourier Transform (FFT) and send the demultiplexed traffic to the demodulator 1050. The demodulator 1050 may demodulate the demultiplexed traffic to generate demodulated traffic. The decoder 1060 may decode the demodulated traffic, and the error detector 1070 may perform checking procedure (e.g., Cyclic Redundancy Check, CRC) to check the received traffic.

For example, the receiver 210 may receive, from a base station, first control information for sidelink communication between the transmitting apparatus and a receiving apparatus, and the control circuitry 1080 may monitor the first control information and control the transmitter 220 to transmit the sidelink channel(s).

According to one embodiment of the present disclosure, the sidelink channel(s) may comprise the physical sidelink shared channel but not the first physical sidelink control channel. In other words, the transmitter 220 of the transmitting apparatus 1000 may be operative to not transmit the first physical sidelink control channel to the receiving apparatus. In an example, the physical sidelink shared channel may be the PSSCH, and the first physical sidelink control channel may be a first PSCCH between the transmitting apparatus 1000 and the receiving apparatus.

Alternatively, according to another embodiment of the present disclosure, the sidelink channel(s) may comprise both the PSSCH and the first PSCCH carrying the second control information. In other word, the transmitter 220 of the transmitting apparatus 1000 may be operative to transmit the first PSCCH carrying the second control information and the PSSCH to the receiving apparatus. The second control information transmitted by the transmitting apparatus 1000 is different from the first control information transmitted by the gNB.

Note that, the transmitting apparatus 1000 shown in FIG. 10 may function as the transmitting apparatus 200 as shown in FIG. 2 or the transmitting apparatus 301 as shown in FIGS. 3, 4A, 4B, 5A, 5B and 8. The detailed operations of the transmitting apparatus 200/301 described with references to FIGS. 3-8 may be applicable to the transmitting apparatus 1000, thus the details thereof are omitted for the purpose of clarity and brevity.

Figure 11:
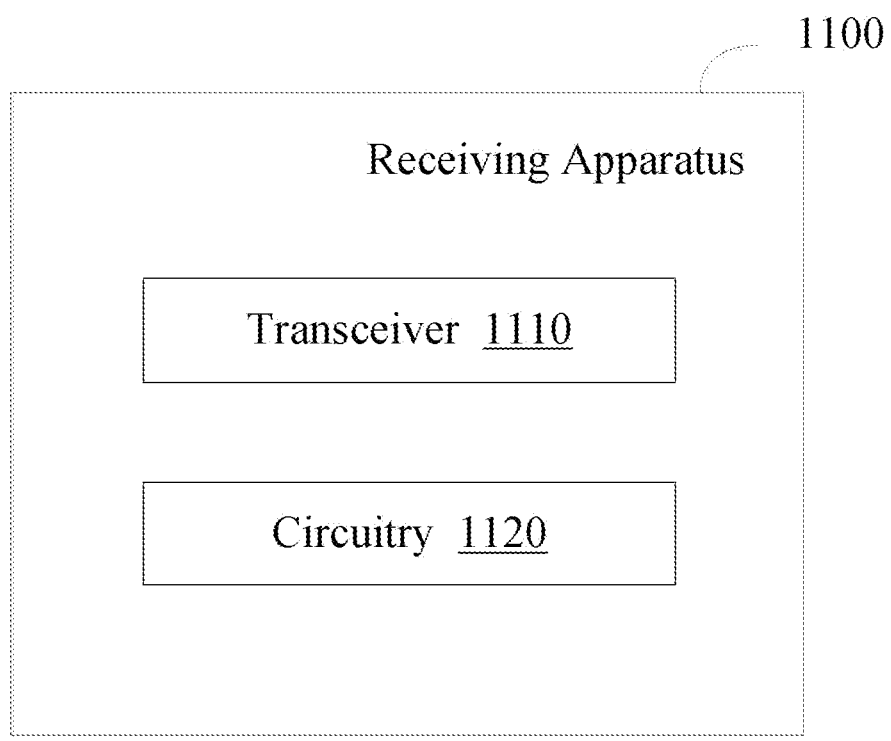
FIG. 11 illustrates a block diagram of a part of a receiving apparatus 1100 according to an embodiment of the present disclosure.

In another embodiment of the present disclosure, there is provided a receiving apparatus as shown in FIG. 11. FIG. 11 illustrates a block diagram of a part of a receiving apparatus 1100 according to an embodiment of the present disclosure. As shown in FIG. 11, the receiving apparatus 1100 may include a transceiver 1110 and circuitry 1120.

It should be noted that the transceiver 1110 and circuitry 1120 disclosed in FIG. 11 are exemplary but not limited. That is, the receiving apparatus 1100 may include more or less structural or functional elements, or variations of the elements recited in FIG. 11. For example, the receiving apparatus 1100 may include a receiver instead of the transceiver 1110. Alternatively, the receiving apparatus 1100 may include a receiver and a transmitter instead of the transceiver 1110.

It should be noted that the transmitting apparatus of FIG. 2 and the receiving apparatus of FIG. 11 may be collectively called as a communication apparatus or combined into one communication apparatus, and such communication apparatus may comprise the transmitter 220, the receiver 210, the transceiver 1110, and circuitry 1120. Further, such communication apparatus may include other structural or functional elements.

As shown in FIG. 11, the transceiver 1110 may receive, from a transmitting apparatus, a physical sidelink shared channel, and the circuitry 1120 may decode the physical sidelink shared channel. In an embodiment, the transceiver 1110 may further receive, from a gNB, first control information for sidelink communication between the transmitting apparatus and the receiving apparatus 1000, but receive no physical sidelink control channel from the transmitting apparatus. In this case, the circuitry 1120 may decode the physical sidelink shared channel according to the first control information. Alternatively, the transceiver 1110 may receive the first control information from the gNB and receive, from the transmitting apparatus, second control information via the first physical sidelink control channel. The second control information is different from the first control information. In this case, the circuitry 1120 may decode the physical sidelink shared channel according to the first control information and the second control information.

In an embodiment, the receiving apparatus 1100 may further comprise a control circuitry, operative to monitor the first control information from the gNB. Alternatively, the circuitry 1120 may be further operative to monitor the first control information from the gNB.

According to an embodiment of the present disclosure, the first control information may be transmitted in a physical downlink control channel or a second physical sidelink control channel between the gNB and terminal apparatuses including the transmitting apparatus and the receiving apparatus 1100.

According to an embodiment of the present disclosure, transmission power of the physical sidelink shared channel may be based on (1) path loss between the transmitting apparatus and the receiving apparatus 1100, (2) geographical distance between the transmitting apparatus and the receiving apparatus 1100, or (3) a configured value.

According to an embodiment of the present disclosure, the first control information may comprise an identification of the transmitting apparatus, an identification of the receiving apparatus 1100, and MCS for the physical sidelink shared channel.

According to an embodiment of the present disclosure, the second control information may not comprise at least an indication on power control value for the physical sidelink shared channel.

According to an embodiment of the present disclosure, the receiving apparatus 1100 may be further operative to, when the first control information is received from the base station and the second control information is received from the transmitting apparatus: decode the physical sidelink shared channel using one of the first control information and the second control information; or compare the first control information and the second control information, and decode the physical sidelink shared channel using one of the first control information and the second control information if the first control information is consistent with the second control information.

According to an embodiment of the present disclosure, a timing from transmission of the first control information to transmission of the physical sidelink shared channel may be fixed. Alternatively, the timing from the transmission of the first control information to the transmission of the physical sidelink shared channel may be flexible and indicated in the first control information.

According to an embodiment of the present disclosure, the transceiver 1110 may transmit HARQ feedback information to the base station after receiving the physical sidelink shared channel from the transmitting apparatus.

According to an embodiment of the present disclosure, the HARQ feedback information may be carried on a physical sidelink feedback channel or a physical uplink control channel between the gNB and the receiving apparatus 1100.

According to an embodiment of the present disclosure, transmission power of the physical sidelink feedback channel or the physical uplink control channel may be based on path loss between the gNB and the receiving apparatus 1100.

Note that, the receiving apparatus 1100 shown in FIG. 11 may function as the receiving apparatus 302 as shown in FIGS. 3, 4A, 4B, 5A, 5B and 8. Therefore, the other technical features in the receiving apparatus 302 as described above can also be incorporated in the receiving apparatus 1100 and will not be described here for avoiding redundancy.

With the receiving apparatus 1100, control signaling overhead for sidelink resource assignment in the gNB scheduling-based mode in NR V2X can be reduced, due to no transmission of a PSCCH from a transmitting apparatus to a receiving apparatus or transmission of a PSCCH with simplified or reduced information from a transmitting apparatus to a receiving apparatus.

Figure 12:
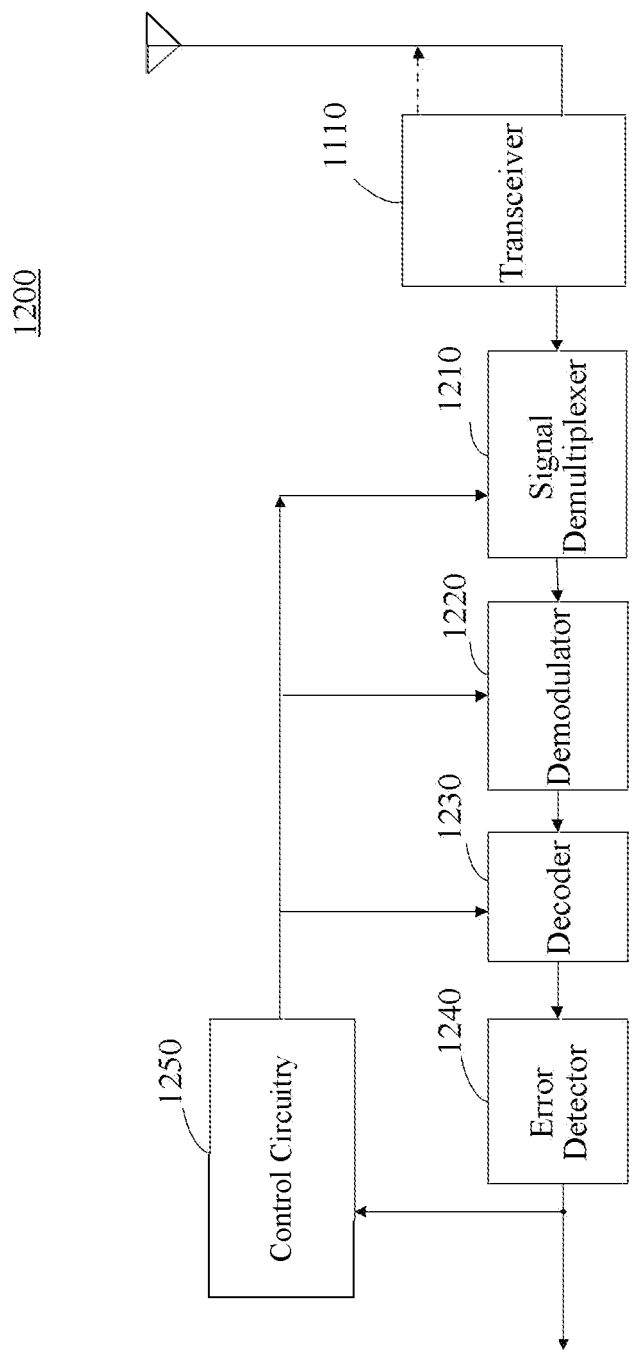
FIG. 12 schematically shows a detailed block diagram of a receiving apparatus 1200 according to an embodiment of the present disclosure.

In another embodiment of the present disclosure, there is provided a receiving apparatus as shown in FIG. 12. FIG. 12 schematically shows a detailed block diagram of a receiving apparatus 1200 according to an embodiment of the present disclosure. As shown in FIG. 12, the receiving apparatus 1200 may include a signal demultiplexer 1210, a demodulator 1220, a decoder 1230, an error detector 1240, a control circuitry 1250, and the transceiver 1110.

The same reference numbers are used in FIG. 12 for indicating the same elements as shown in FIG. 11. To avoid having the description become complex, in this case, the constituent elements related to the reception of traffic, which are closely connected with the features of the present embodiment, are mainly shown, and other elements are omitted. For example, the receiving apparatus 1200 may further comprise other elements, such as an encoder, a modulator, and a signal assigner.

The transceiver 1110 may receive traffic from the antenna. The signal demultiplexer 1210 may demultiplex the received traffic by Fast Fourier Transform (FFT) and send the demultiplexed traffic to the demodulator 1220. The demodulator 1220 may demodulate the demultiplexed traffic to generate demodulated traffic. The decoder 1230 may decode the demodulated traffic, and the error detector 1240 may perform checking procedure (e.g., Cyclic Redundancy Check, CRC) to check the received traffic. The control circuitry 1250 may monitor the received traffic and controls the operation of the signal demultiplexer 1210, the demodulator 1220, and the decoder 1230.

Note that, the receiving apparatus 1200 shown in FIG. 12 may function as the receiving apparatus 1100 shown in FIG. 11. For example, the circuitry 1120 may include the signal demultiplexer 1210, the demodulator 1220, the decoder 1230, the error detector 1240, and the control circuitry 1250. Alternatively, one or more of these elements may also be separated from the circuitry 1120 depending on specific requirements.

For example, the transceiver 1110 may receive, from the transmitting apparatus, a physical sidelink shared channel, and a combination of the signal demultiplexer 1210, the demodulator 1220, the decoder 1230, the error detector 1240, and the control circuitry 1250 may decode the physical sidelink shared channel. In an embodiment, the transceiver 1110 may further receive, from a gNB, first control information for sidelink communication between a transmitting apparatus and the receiving apparatus 1200, but receive no physical sidelink control channel from the transmitting apparatus. Alternatively, the transceiver 1110 may further receive the first control information from the gNB and receive, from the transmitting apparatus, second control information via the first physical sidelink control channel.

Note that, the receiving apparatus 1200 shown in FIG. 12 may function as the receiving apparatus 302 as shown in FIGS. 3, 4A, 4B, 5A, 5B and 8. Therefore, the other technical features in the receiving apparatus 302 as described above can also be incorporated in the receiving apparatus 1200 and will not be described here for avoiding redundancy.

Figure 13:
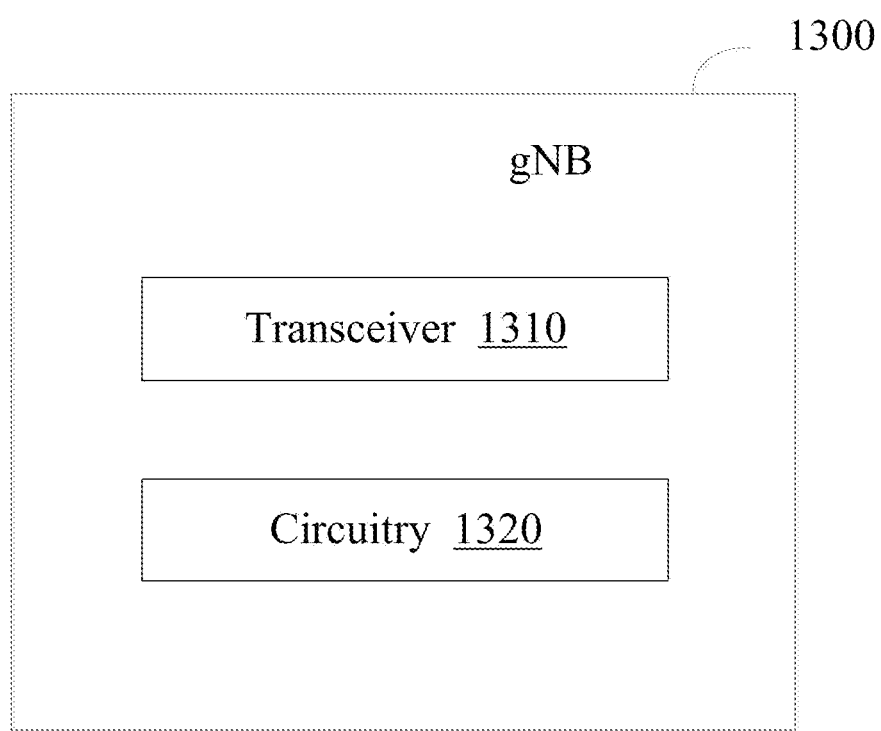
FIG. 13 illustrates a block diagram of a part of a gNB 1300 according to an embodiment of the present disclosure.

In another embodiment of the present disclosure, there is provided a base station as shown in FIG. 13. FIG. 13 illustrates a block diagram of a part of a base station (gNB) 1300 according to an embodiment of the present disclosure. As shown in FIG. 13, the gNB 1300 may include a transceiver 1310 and circuitry 1320.

It should be noted that, the transceiver 1310 and the circuitry 1320 disclosed in FIG. 13 are exemplary but not limited. That is, the gNB 1300 may include more or less structural or functional elements, or variations of the elements recited in FIG. 13. For example, the gNB 1300 may include a transmitter instead of the transceiver 1310. Alternatively, the gNB 1300 may further include a receiver.

As shown in FIG. 13, the circuitry may generate first control information for sidelink communication between a transmitting apparatus and a receiving apparatus, and the transceiver 1310 may transmit the first control information to the transmitting apparatus and the receiving apparatus. In an embodiment, the sidelink communication comprises transmitting a physical sidelink shared channel from the transmitting apparatus to the receiving apparatus. Alternatively, the sidelink communication comprises transmitting the physical sidelink shared channel and a first physical sidelink control channel with second control information from the transmitting apparatus to the receiving apparatus. The second control information is different from the first control information.

According to an embodiment of the present disclosure, the first control information may be transmitted in a physical downlink control channel or a second physical sidelink control channel between the gNB 1300 and terminal apparatuses including the transmitting apparatus and the receiving apparatus.

According to an embodiment of the present disclosure, transmission power of the physical sidelink shared channel may be based on (1) path loss between the transmitting apparatus and the receiving apparatus, (2) geographical distance between the transmitting apparatus and the receiving apparatus, or (3) a configured value.

According to an embodiment of the present disclosure, the first control information may comprise an identification of the transmitting apparatus, an identification of the receiving apparatus, and MCS for the physical sidelink shared channel.

According to an embodiment of the present disclosure, the second control information may not comprise at least indication on power control value for the physical sidelink shared channel.

According to an embodiment of the present disclosure, when the first control information is received from the gNB 1300 and the second control information is received from the transmitting apparatus, the receiving apparatus may decode the physical sidelink shared channel using one of the first control information and the second control information. Alternatively, the receiving apparatus may compare the first control information and the second control information, and decode the physical sidelink shared channel using one of the first control information and the second control information if the first control information is consistent with the second control information.

According to an embodiment of the present disclosure, a timing from transmission of the first control information to transmission of the physical sidelink shared channel may be fixed. Alternatively, the timing from the transmission of the first control information to the transmission of the physical sidelink shared channel may be flexible and indicated in the first control information.

According to an embodiment of the present disclosure, the transceiver 1310 may further receive HARQ feedback information from the receiving apparatus after the receiving apparatus receives the physical sidelink shared channel from the transmitting apparatus.

According to an embodiment of the present disclosure, the HARQ feedback information may be carried on a physical sidelink feedback channel or a physical uplink control channel between the gNB 1300 and the receiving apparatus.

According to an embodiment of the present disclosure, transmission power of the physical sidelink feedback channel or the physical uplink control channel may be based on path loss between the gNB 1300 and the receiving apparatus.

Note that, the gNB 1300 shown in FIG. 13 may function as the gNB 303 as shown in FIGS. 3, 4A, 4B, 5A, 5B and 8. Therefore, the other technical features in the gNB 303 as described above can also be incorporated in the gNB 1300 and will not be described here for avoiding redundancy.

With the gNB 1300, control signaling overhead for sidelink resource assignment in the gNB scheduling-based mode in NR V2X can be reduced, due to no transmission of a PSCCH from a transmitting apparatus to a receiving apparatus or transmission of a PSCCH with simplified or reduced information from a transmitting apparatus to a receiving apparatus.

Figure 14:
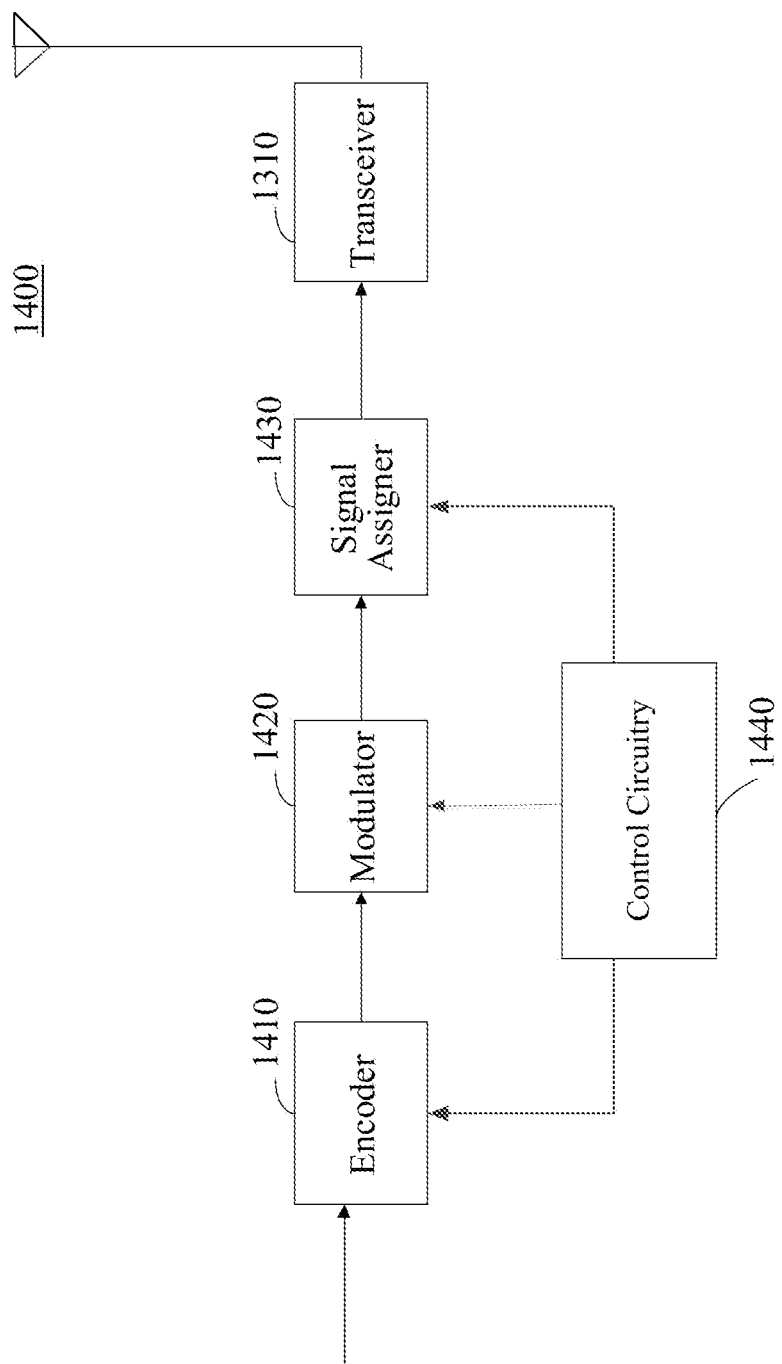
FIG. 14 schematically shows a detailed block diagram of a gNB 1400 according to an embodiment of the present disclosure.

In another embodiment of the present disclosure, there is provided a base station as shown in FIG. 14. FIG. 14 schematically shows a detailed block diagram of a base station (gNB) 1400 according to an embodiment of the present disclosure. As shown in FIG. 14, the gNB 1400 may include an encoder 1410, a modulator 1420, a signal assigner 1430, a control circuitry 1440, and the transceiver 1430.

The same reference numbers are used in FIG. 14 for indicating the same elements as shown in FIG. 13. To avoid having the description become complex, in this case, the constituent elements related to the transmission of control information for sidelink communication, which are closely connected with the features of the present embodiment, are mainly shown.

The encoder 1410 may encode traffic to be transmitted to obtain the encoded signal, the modulator 1420 may modulate the encoded signal to obtain the modulated signal, the signal assigner 1430 may assign resources for the modulated signal according to an output result from the control circuitry 1440, and the transceiver 1310 may transmit the modulated signal. The control circuitry 1440 may control the operations of the encoder 1410, the modulator 1420, and the signal assigner 1430.

Note that, the gNB 1400 shown in FIG. 14 may function as the gNB 1300 shown in FIG. 13. For example, the circuitry 1320 may include the encoder 1410, the modulator 1420, the signal assigner 1430 and the control circuitry 1440. Alternatively, one or more of these elements may also be separated from the circuitry 1320 depending on specific requirements.

For example, a combination of the encoder 1410, the modulator 1420, the signal assigner 1430 and the control circuitry 1440 may generate first control information for sidelink communication between a transmitting apparatus and a receiving apparatus, and the transceiver 1310 may transmit the first control information to the transmitting apparatus and the receiving apparatus. The first control information may be monitored by both the transmitting apparatus and the receiving apparatus.

In an embodiment, the sidelink communication may comprise transmitting a physical sidelink shared channel but no physical sidelink control channel. Alternatively, the sidelink communication may comprise transmitting the physical sidelink shared channel and a first physical sidelink control channel with second control information.

In an embodiment, the transceiver 1310 may further receive some assistance information from the transmitting apparatus, so that the gNB 1400 may determine at least one of MCS, resource allocation, transmission power of a physical sidelink shared channel and any other suitable control information for the sidelink communication between the transmitting apparatus and the receiving apparatus. For example, the assistance information comprises at least one of CSI, traffic characteristics, geographical formation, channel measurement results and any other suitable information.

In an embodiment, the transceiver 1310 may further receive HARQ feedback information from the receiving apparatus after the receiving apparatus receives and decodes sidelink channel(s), for example, at least the physical sidelink shared channel, from the transmitting apparatus. The HARQ feedback information may be carried on a feedback channel, for example, PSFCH or PUCCH, between the gNB 1400 and the receiving apparatus.

Note that, the gNB 1400 shown in FIG. 14 may function as the gNB 303 as shown in FIGS. 3, 4A, 4B, 5A, 5B and 8. Therefore, the other technical features in the gNB 303 as described above can also be incorporated in the gNB 1400 and will not be described here for avoiding redundancy.

Figure 15:
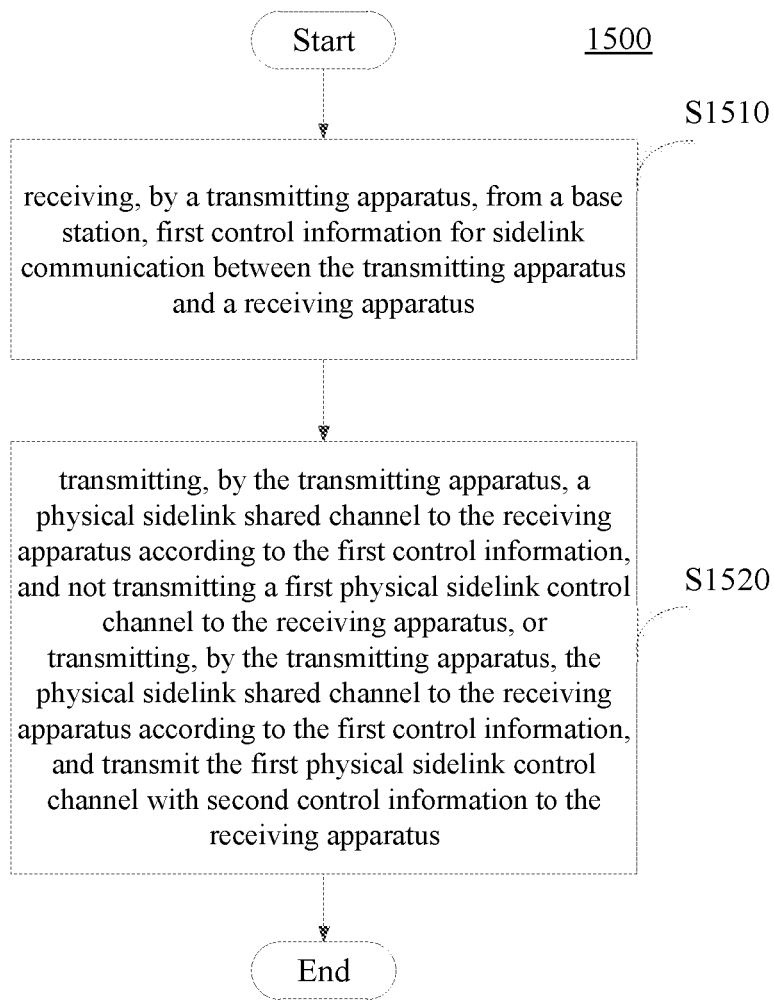
FIG. 15 schematically shows a flowchart of a communicating method 1500 for a transmitting apparatus according to an embodiment of the present disclosure.

In another embodiment of the present disclosure, there is provided a communicating method for a transmitting apparatus. FIG. 15 schematically shows a flowchart of a communicating method 1500 for a transmitting apparatus according to an embodiment of the present disclosure. For example, the communicating method may be performed by the transmitting apparatus 200 as shown in FIG. 2, the transmitting apparatus 1000 as shown in FIG. 10, or the transmitting apparatus 301 as shown in FIGS. 3, 4A, 4B, 5A, 5B and 8.

Although specific steps are disclosed in FIG. 15, such steps are exemplary. That is, the present disclosure is well suited to performing various other steps or variations of the steps recited in FIG. 15.

At a step S1510, the transmitting apparatus 200/1000/301 may receive, from a base station, first control information for sidelink communication between the transmitting apparatus 200/1000/301 and a receiving apparatus.

In an embodiment, at a step S1520, the transmitting apparatus 200/1000/301 may transmit a physical sidelink shared channel to the receiving apparatus according to the first control information, but not transmit a first physical sidelink control channel to the receiving apparatus. Alternatively, at the step S1520, the transmitting apparatus 200/1000/301 may transmit the physical sidelink shared channel to the receiving apparatus according to the first control information, and transmit the first physical sidelink control channel with second control information to the receiving apparatus. The second control information is different from the first control information.

With the communicating method 1500 for a transmitting apparatus, control signaling overhead for sidelink resource assignment in the gNB scheduling-based mode in NR V2X can be reduced, due to no transmission of a PSCCH from a transmitting apparatus to a receiving apparatus or transmission of a PSCCH with simplified or reduced information from a transmitting apparatus to a receiving apparatus.

Figure 16:
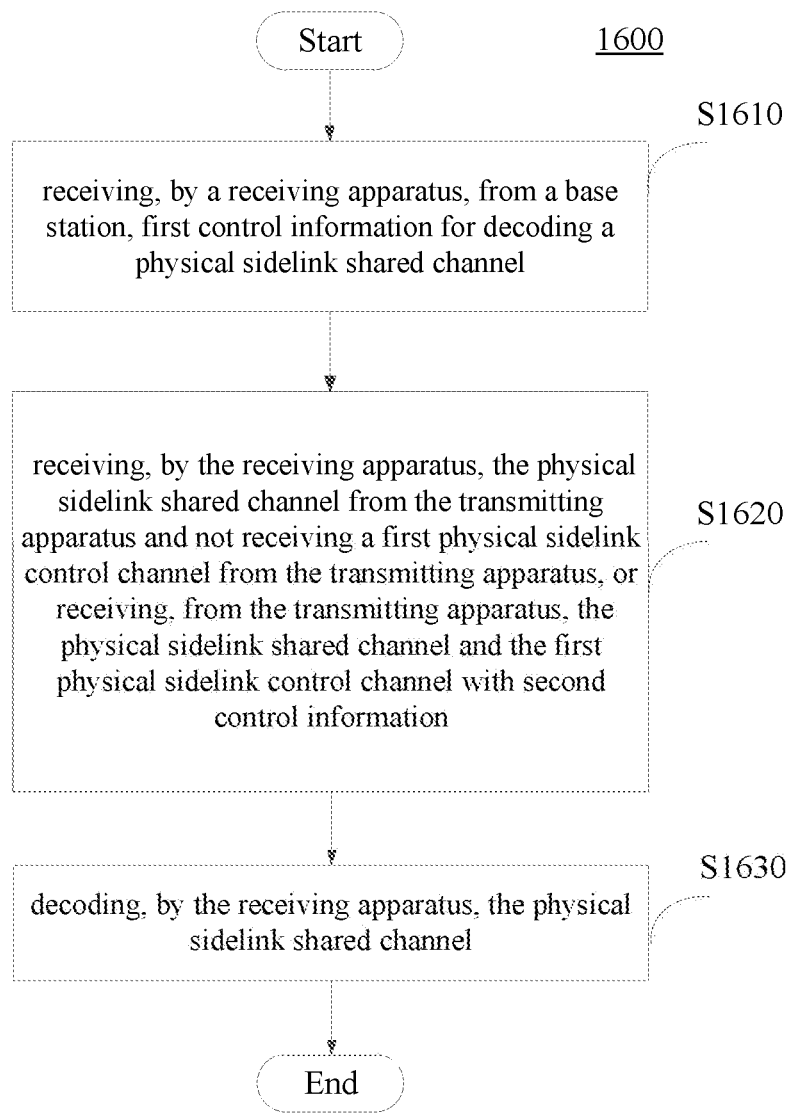
FIG. 16 schematically shows a flowchart of a communicating method 1600 for a receiving apparatus according to an embodiment of the present disclosure.

In another embodiment of the present disclosure, there is provided a communicating method for a receiving apparatus. FIG. 16 schematically shows a flowchart of a communicating method 1600 for a receiving apparatus according to an embodiment of the present disclosure. For example, the communicating method may be performed by the receiving apparatus 1100 as shown in FIG. 11, the receiving apparatus 1200 as shown in FIG. 12, or the receiving apparatus 302 as shown in FIGS. 3, 4A, 4B, 5A, 5B and 8.

Although specific steps are disclosed in FIG. 16, such steps are exemplary. That is, the present disclosure is well suited to performing various other steps or variations of the steps recited in FIG. 16.

At a step S1610, the receiving apparatus 1100/1200/302 may receive, from a base station, first control information for decoding a physical sidelink shared channel.

In an embodiment, at a step S1620, the receiving apparatus 1100/1200/302 may receive the physical sidelink shared channel from the transmitting apparatus and not receive a first physical sidelink control channel from the transmitting apparatus. Alternatively, at the step S1620, the receiving apparatus 1100/1200/302 may receive, from the transmitting apparatus, the physical sidelink shared channel and a first physical sidelink control channel with second control information. The second control information is different from the first control information.

At a step S1630, the receiving apparatus 1100/1200/302 may decode the physical sidelink shared channel.

With the communicating method 1600 for a receiving apparatus, control signaling overhead for sidelink resource assignment in the gNB scheduling-based mode in NR V2X can be reduced, due to no transmission of a PSCCH from a transmitting apparatus to a receiving apparatus or transmission of a PSCCH with simplified or reduced information from a transmitting apparatus to a receiving apparatus.

Figure 17:
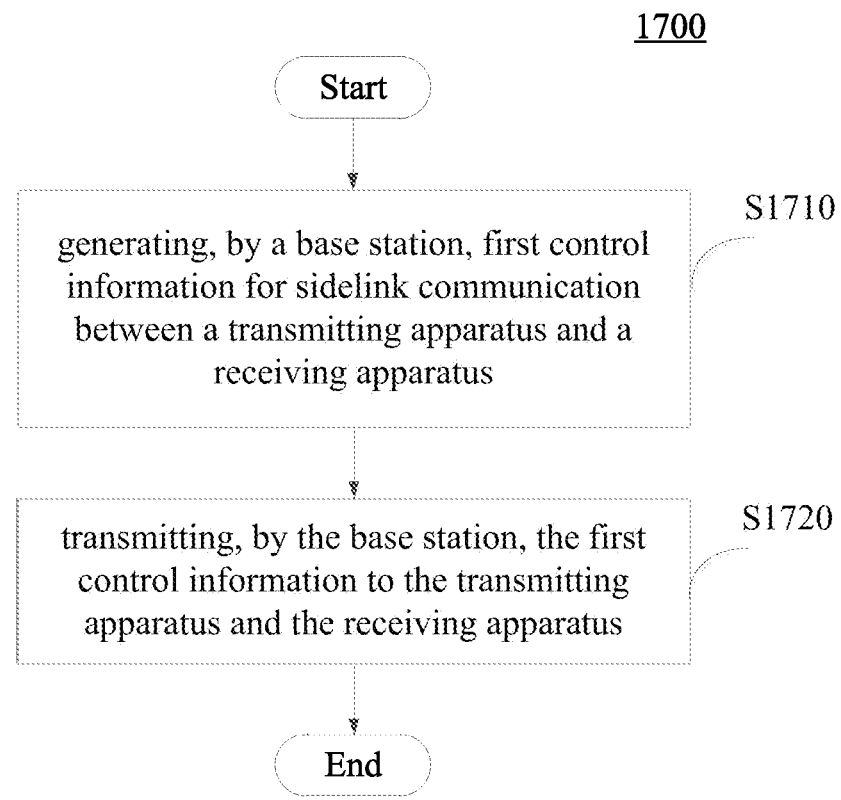
FIG. 17 schematically shows a flowchart of a communicating method 1700 for a gNB according to an embodiment of the present disclosure.

In another embodiment of the present disclosure, there is provided a communicating method for a base station. FIG. 17 schematically shows a flowchart of a communicating method 1700 for a base station (gNB) according to an embodiment of the present disclosure. For example, the communicating method may be performed by the gNB 1300 as shown in FIG. 13, the gNB 1400 as shown in FIG. 14, or the gNB 303 as shown in FIGS. 3, 4A, 4B, 5A, 5B and 8.

Although specific steps are disclosed in FIG. 17, such steps are exemplary. That is, the present disclosure is well suited to performing various other steps or variations of the steps recited in FIG. 17.

At a step S1710, the gNB 1300/1400/303 may generate first control information for sidelink communication between a transmitting apparatus and a receiving apparatus. At a step S1720, the gNB 1300/1400/303 may transmit the first control information to the transmitting apparatus and the receiving apparatus.

In an embodiment, the sidelink communication may comprise transmitting a physical sidelink shared channel. Alternatively, the sidelink communication may comprise transmitting the physical sidelink shared channel and a first physical sidelink control channel with second control information.

With the communicating method 1700 for a gNB, control signaling overhead for sidelink resource assignment in the gNB scheduling-based mode in NR V2X can be reduced, due to no transmission of a PSCCH from a transmitting apparatus to a receiving apparatus or transmission of a PSCCH with simplified or reduced information from a transmitting apparatus to a receiving apparatus.

In order to facilitating a feedback mechanism for sidelink communication, there are provided a transmitting apparatus, a receiving apparatus, a base station and communicating methods thereof. Theses apparatuses and methods shown in FIGS. 18-23 will be described in detail below with reference to the scenario shown in FIG. 9.

Figure 18:
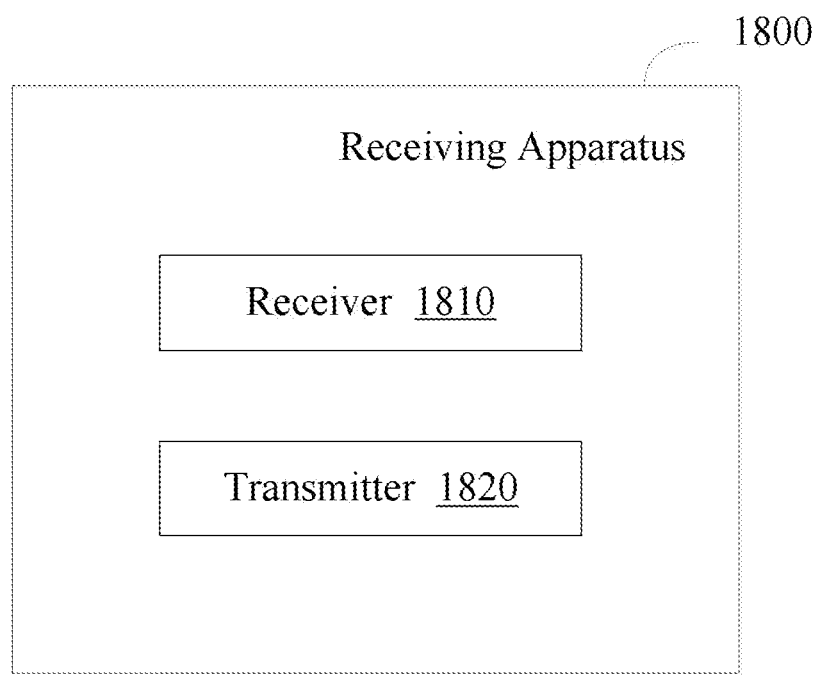
FIG. 18 illustrates a block diagram of a part of a receiving apparatus 1800 for sidelink HARQ feedback according to an embodiment of the present disclosure.

In another embodiment of the present disclosure, there is provided a receiving apparatus as shown in FIG. 18. FIG. 18 illustrates a block diagram of a part of a receiving apparatus 1800 for sidelink HARQ feedback according to an embodiment of the present disclosure.

As shown in FIG. 18, the receiving apparatus 1800 may include a receiver 1810 and a transmitter 1820. The receiver 1810 may receive sidelink transmission from a transmitting apparatus. The transmitter 1820 may transmit sidelink HARQ feedback information to a gNB.

It should be noted that, the receiver 1810 and the transmitter 1820 disclosed in FIG. 18 are exemplary but not limited. That is, the receiving apparatus 1800 may include more or less structural or functional elements, or variations of the elements recited in FIG. 18. For example, the receiving apparatus 1800 may further include a control circuitry. Alternatively, the receiving apparatus 1800 may include a transceiver instead of the receiver 1810 and the transmitter 1820.

In an embodiment, the sidelink HARQ feedback information is transmitted via PSFCH or PUCCH.

In an embodiment, transmission power of a sidelink feedback channel carrying the sidelink HARQ feedback information, for example, the PSFCH or PUCCH, is based on path loss of the gNB to the receiving apparatus.

Note that, the receiving apparatus 1800 shown in FIG. 18 may function as the receiving apparatus 902 as shown in FIG. 9. Therefore, the other technical features in the receiving apparatus 902 as described above can also be incorporated in the receiving apparatus 1800 and will not be described here for avoiding redundancy.

With the receiving apparatus 1800, the feedback mechanism from the receiving apparatus 1800 to a gNB enables the gNB to schedule retransmission based on HARQ feedback information received from the receiving apparatus.

Figure 19:
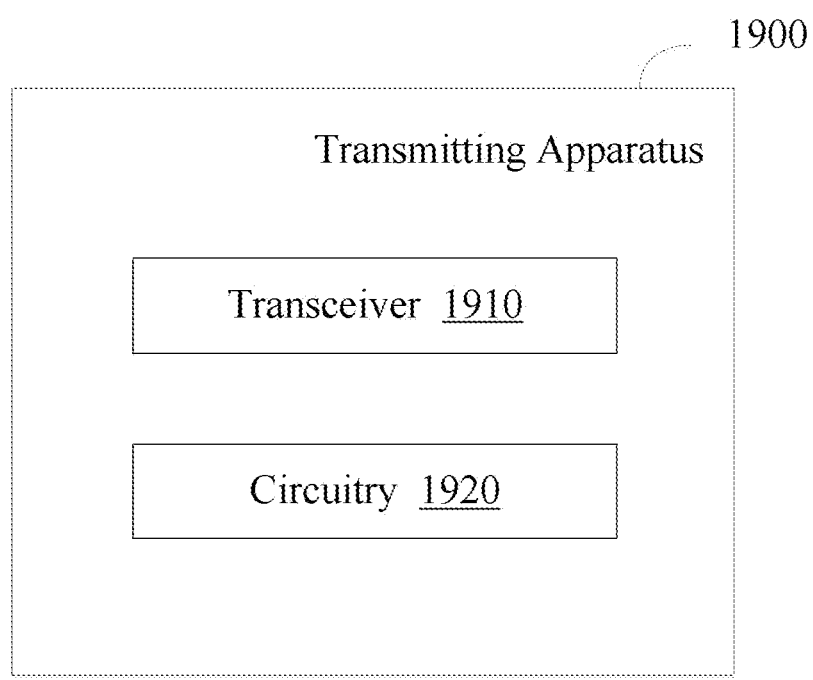
FIG. 19 illustrates a block diagram of a part of a transmitting apparatus 1900 for sidelink HARQ feedback according to an embodiment of the present disclosure.

In another embodiment of the present disclosure, there is provided a transmitting apparatus as shown in FIG. 19. FIG. 19 illustrates a block diagram of a part of a transmitting apparatus 1900 for sidelink HARQ feedback according to an embodiment of the present disclosure.

As shown in FIG. 19, the transmitting apparatus 1900 may include a transceiver 1910 and circuitry 1920. The circuitry 1920 may generate a sidelink signal for sidelink transmission. The transceiver 1910 may perform the sidelink transmission to a receiving apparatus. In an embodiment, the receiving apparatus may transmit sidelink HARQ feedback information to a gNB after receiving the sidelink transmission from the transmitting apparatus 1900.

It should be noted that, the transceiver 1910 disclosed in FIG. 19 is exemplary but not limited. That is, the transmitting apparatus 1900 may include more or less structural or functional elements, or variations of the elements recited in FIG. 19. For example, transmitting apparatus 1900 may include a transmitter instead of the transceiver 1910. Alternatively, transmitting apparatus 1900 may include a transmitter and a receiver instead of the transceiver 1910.

It should be noted that the transmitting apparatus of FIG. 19 and the receiving apparatus of FIG. 18 may be collectively called as a communication apparatus or combined into one communication apparatus, and such communication apparatus may comprise the transmitter 1820, the receiver 1810, the transceiver 1910 and circuitry 1920. Further, such communication apparatus may include other structural or functional elements.

In an embodiment, the sidelink HARQ feedback information is transmitted via PSFCH or PUCCH.

In an embodiment, transmission power of a sidelink feedback channel carrying the sidelink HARQ feedback information, for example, the PSFCH or PUCCH, is based on path loss of the gNB to the receiving apparatus.

Note that, the transmitting apparatus 1900 shown in FIG. 19 may function as the transmitting apparatus 901 as shown in FIG. 9. Therefore, the other technical features in the transmitting apparatus 901 as described above can also be incorporated in the transmitting apparatus 1900 and will not be described here for avoiding redundancy.

With the transmitting apparatus 1900, the feedback mechanism from a receiving apparatus to a gNB enables the gNB to schedule retransmission based on HARQ feedback information received from the receiving apparatus.

Figure 20:
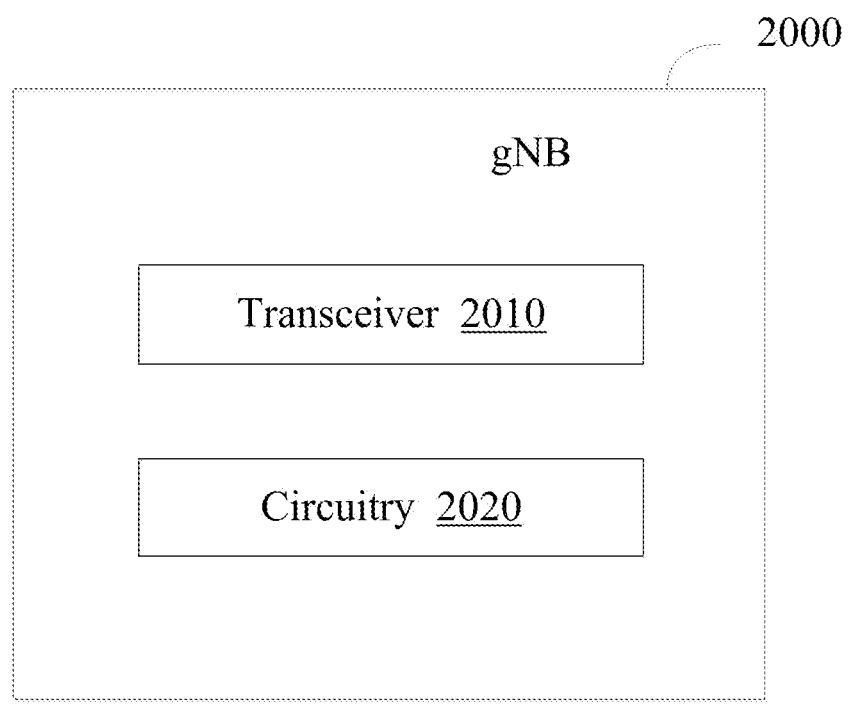
FIG. 20 illustrates a block diagram of a part of a gNB 2000 for sidelink HARQ feedback according to an embodiment of the present disclosure.

In another embodiment of the present disclosure, there is provided a base station as shown in FIG. 20. FIG. 20 illustrates a block diagram of a part of a base station (gNB) 2000 for sidelink HARQ feedback according to an embodiment of the present disclosure.

As shown in FIG. 20, the gNB 2000 may include a transceiver 2010 and circuitry 2020. The transceiver 2010 may receive sidelink HARQ feedback information from a receiving apparatus. The circuitry 2020 may process the received sidelink HARQ feedback information. In an embodiment, the sidelink HARQ feedback information may be transmitted after the receiving apparatus receives sidelink transmission from a transmitting apparatus.

It should be noted that, the transceiver 2010 disclosed in FIG. 20 is exemplary but not limited. That is, the gNB 2000 may include more or less structural or functional elements, or variations of the elements recited in FIG. 20. For example, the gNB 2000 may include a receiver instead of the transceiver 2010. Alternatively, the gNB 2000 may include a transmitter and a receiver instead of the transceiver 2010.

In an embodiment, the sidelink HARQ feedback information is transmitted via PSFCH or PUCCH.

In an embodiment, transmission power of a sidelink feedback channel carrying the sidelink HARQ feedback information, for example, the PSFCH or PUCCH, is based on path loss of the gNB to the receiving apparatus.

Note that, the gNB 2000 shown in FIG. 20 may function as the gNB 903 as shown in FIG. 9. Therefore, the other technical features in the gNB 903 as described above can also be incorporated in the gNB 2000 and will not be described here for avoiding redundancy.

With the gNB 2000, the feedback mechanism from a receiving apparatus to the gNB enables the gNB to schedule retransmission based on HARQ feedback information received from the receiving apparatus.

Figure 21:
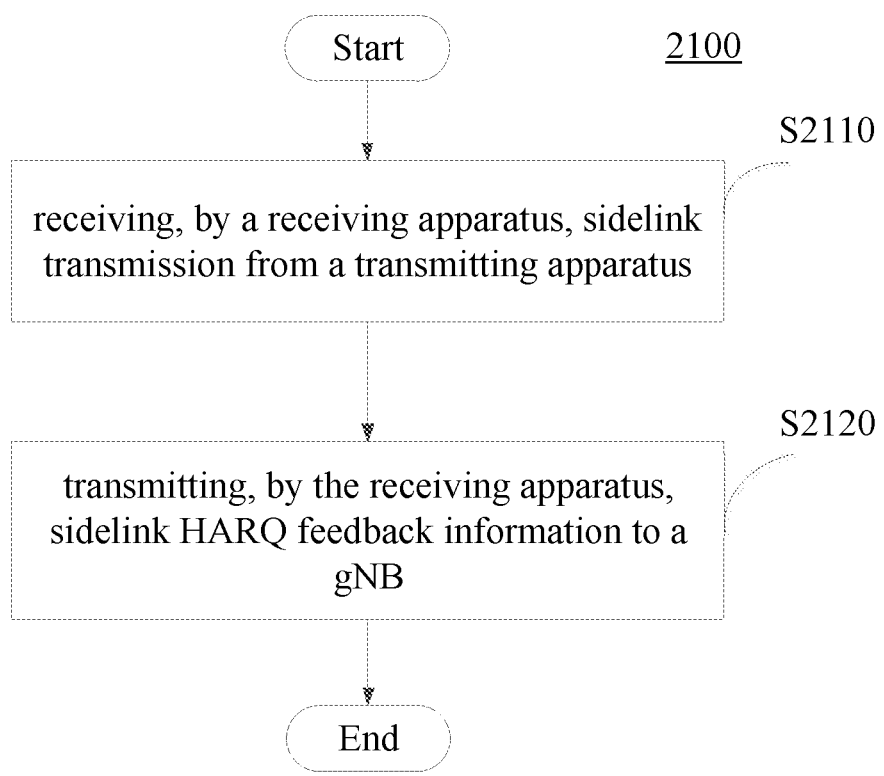
FIG. 21 schematically shows a flowchart of a communicating method 2100 for a receiving apparatus for sidelink HARQ feedback according to an embodiment of the present disclosure.

In another embodiment of the present disclosure, there is provided a communicating method for a receiving apparatus for sidelink HARQ feedback. FIG. 21 schematically shows a flowchart of a communicating method 2100 for a receiving apparatus for sidelink HARQ feedback according to an embodiment of the present disclosure. For example, the communicating method may be performed by the receiving apparatus 1800 as shown in FIG. 18 or the receiving apparatus 902 as shown in FIG. 9.

Although specific steps are disclosed in FIG. 21, such steps are exemplary. That is, the present disclosure is well suited to performing various other steps or variations of the steps recited in FIG. 21.

At a step S2110, the receiving apparatus 1800/902 may receive sidelink transmission from a transmitting apparatus. At a step S2120, the receiving apparatus 18/902 may transmit sidelink HARQ feedback information to a gNB.

With the communicating method 2100, the feedback mechanism from a receiving apparatus to a gNB enables the gNB to schedule retransmission based on HARQ feedback information received from the receiving apparatus.

Figure 22:
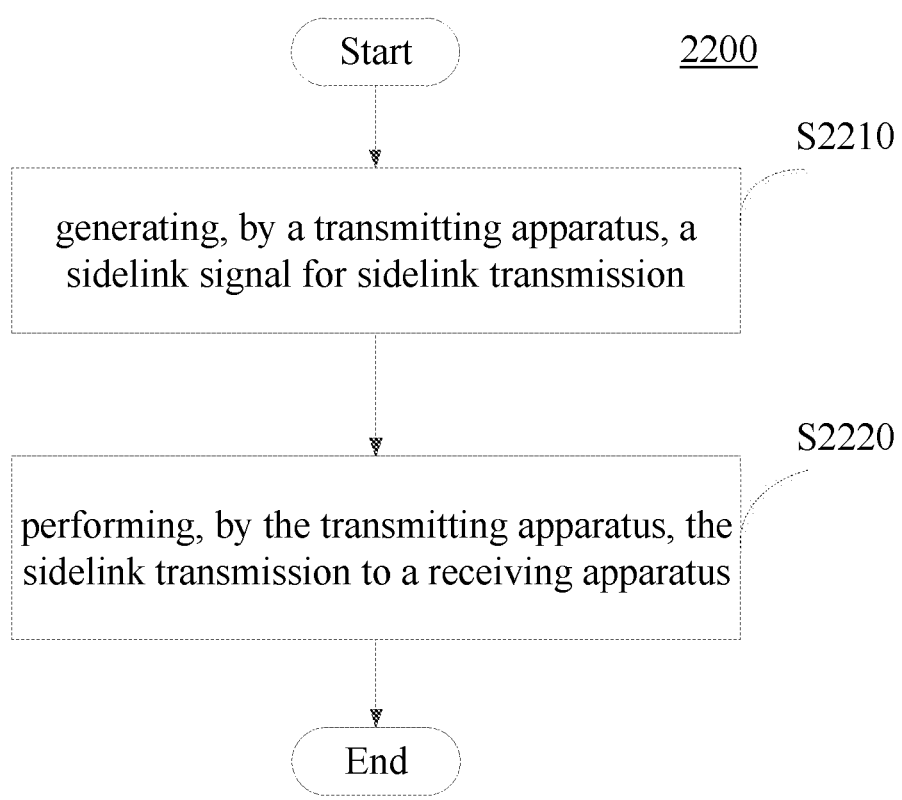
FIG. 22 schematically shows a flowchart of a communicating method 2200 for a transmitting apparatus for sidelink HARQ feedback according to an embodiment of the present disclosure.

In another embodiment of the present disclosure, there is provided a communicating method for a transmitting apparatus for sidelink HARQ feedback. FIG. 22 schematically shows a flowchart of a communicating method 2200 for a transmitting apparatus for sidelink HARQ feedback according to an embodiment of the present disclosure. For example, the communicating method 2200 may be performed by the transmitting apparatus 1900 as shown in FIG. 19 or the transmitting apparatus 901 as shown in FIG. 9.

Although specific steps are disclosed in FIG. 22, such steps are exemplary. That is, the present disclosure is well suited to performing various other steps or variations of the steps recited in FIG. 22.

At a step S2210, the transmitting apparatus 1900/901 may generate a sidelink signal for sidelink transmission. At a step S2220, the transmitting apparatus 1900/901 may perform the sidelink transmission to a receiving apparatus. In an embodiment, sidelink HARQ feedback information is transmitted from the receiving apparatus to a gNB after the sidelink transmission is received by the receiving apparatus.

With the communicating method 2200, the feedback mechanism from a receiving apparatus to a gNB enables the gNB to schedule retransmission based on HARQ feedback information received from the receiving apparatus.

Figure 23:
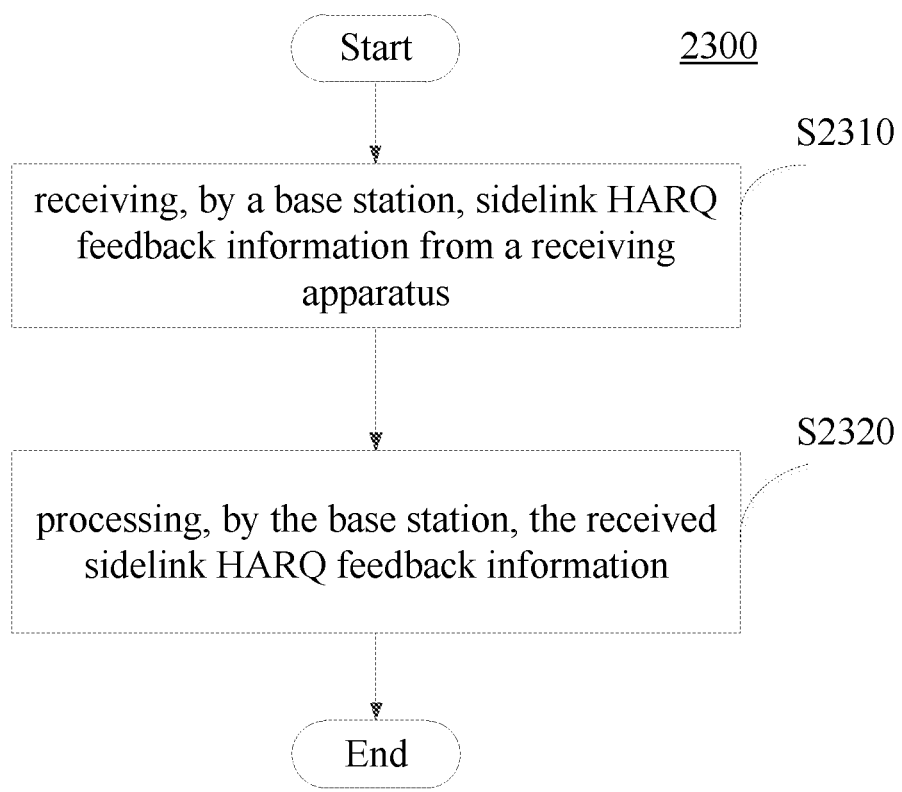
FIG. 23 schematically shows a flowchart of a communicating method 2300 for a gNB for sidelink HARQ feedback according to an embodiment of the present disclosure.

In another embodiment of the present disclosure, there is provided a communicating method for a base station for sidelink HARQ feedback. FIG. 23 schematically shows a flowchart of a communicating method 2300 for a gNB for sidelink HARQ feedback according to an embodiment of the present disclosure. For example, the communicating method 2300 may be performed by the gNB 2000 as shown in FIG. 20 or the gNB 903 as shown in FIG. 9.

Although specific steps are disclosed in FIG. 23, such steps are exemplary. That is, the present disclosure is well suited to performing various other steps or variations of the steps recited in FIG. 23.

At a step S2310, the gNB 2000/903 may receive sidelink HARQ feedback information from a receiving apparatus. At a step S2320, the gNB 2000/903 may process the received sidelink HARQ feedback information. In an embodiment, the sidelink HARQ feedback information is transmitted after the receiving apparatus receives sidelink transmission from a transmitting apparatus.

With the communicating method 2300, the feedback mechanism from a receiving apparatus to a gNB enables the gNB to schedule retransmission based on HARQ feedback information received from the receiving apparatus.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It is to be noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A transmitting apparatus, comprising:
  a receiver, operative to receive, from a base station, first control information for sidelink communication between the transmitting apparatus and a receiving apparatus; and
  a transmitter, operative to transmit a physical sidelink shared channel to the receiving apparatus according to the first control information,
  wherein the transmitter is operative not to transmit a first physical sidelink control channel to the receiving apparatus, or
  the transmitter is operative to transmit the first physical sidelink control channel with second control information to the receiving apparatus.

(2). The transmitting apparatus according to (1), wherein the first control information is transmitted in a physical downlink control channel or a second physical sidelink control channel between the base station and terminal apparatuses including the transmitting apparatus and the receiving apparatus.

(3). The transmitting apparatus according to (1), the transmitting apparatus further comprising circuitry, operative to control transmission power of the physical sidelink shared channel based on (1) path loss between the transmitting apparatus and the receiving apparatus, (2) geographical distance between the transmitting apparatus and the receiving apparatus, or (3) a configured value.

(4). The transmitting apparatus according to (1), wherein the first control information comprises an identification of the transmitting apparatus, an identification of the receiving apparatus, and Modulation Coding Scheme (MCS) for the physical sidelink shared channel.

(5). The transmitting apparatus according to (1), wherein the second control information at least comprises no indication on power control value for the physical sidelink shared channel.

(6). The transmitting apparatus according to (1), wherein when the first control information is received from the base station and the second control information is received from the transmitting apparatus,
  the receiving apparatus is operative to decode the physical sidelink shared channel using one of the first control information and the second control information; or
  the receiving apparatus is operative to compare the first control information and the second control information, and to decode the physical sidelink shared channel using one of the first control information and the second control information if the first control information is consistent with the second control information.
(7). The transmitting apparatus according to (1), wherein the receiving apparatus is operative to transmit HARQ feedback information to the base station after receiving the physical sidelink shared channel from the transmitting apparatus.
(8). The transmitting apparatus according to (7), wherein the HARQ feedback information is carried on a physical sidelink feedback channel or a physical uplink control channel between the base station and the receiving apparatus.
(9). The transmitting apparatus according to (8), wherein transmission power of the physical sidelink feedback channel or the physical uplink control channel is based on path loss between the base station and the receiving apparatus.
(10). The transmitting apparatus according to (1), wherein a timing from transmission of the first control information to transmission of the physical sidelink shared channel is fixed; or
the timing from the transmission of the first control information to the transmission of the physical sidelink shared channel is flexible and indicated in the first control information.
(11). A receiving apparatus, comprising:
a transceiver, operative to receive, from a transmitting apparatus, a physical sidelink shared channel; and
circuitry, operative to decode the physical sidelink shared channel,
wherein the transceiver being further operative to receive, from a base station, first control information for decoding the physical sidelink shared channel, or
the transceiver being further operative to receive, from the base station, the first control information and receive, from the transmitting apparatus, second control information via a first physical sidelink control channel.
(12). The receiving apparatus according to (11), wherein the first control information is transmitted in a physical downlink control channel or a second physical sidelink control channel between the base station and terminal apparatuses including the transmitting apparatus and the receiving apparatus.
(13). The receiving apparatus according to (11), wherein transmission power of the physical sidelink shared channel is based on (1) path loss between the transmitting apparatus and the receiving apparatus, (2) geographical distance between the transmitting apparatus and the receiving apparatus, or (3) a configured value.
(14). The receiving apparatus according to (11), wherein the first control information comprises an identification of the transmitting apparatus, an identification of the receiving apparatus, and Modulation Coding Scheme (MCS) for the physical sidelink shared channel.
(15). The receiving apparatus according to (11), wherein the second control information at least comprises no indication on power control value for the physical sidelink shared channel.
(16). The receiving apparatus according to (11), the receiving apparatus is further operative to, when the first control information is received from the base station and the second control information is received from the transmitting apparatus:

decode the physical sidelink shared channel using one of the first control information and the second control information; or
compare the first control information and the second control information, and decode the physical sidelink shared channel using one of the first control information and the second control information if the first control information is consistent with the second control information.
(17). The receiving apparatus according to (11), wherein the transceiver is further operative to transmit HARQ feedback information to the base station after receiving the physical sidelink shared channel from the transmitting apparatus.
(18). The receiving apparatus according to (17), wherein the HARQ feedback information is carried on a physical sidelink feedback channel or a physical uplink control channel between the base station and the receiving apparatus.
(19). The receiving apparatus according to (18), wherein transmission power of the physical sidelink feedback channel or the physical uplink control channel is based on path loss between the base station and the receiving apparatus.
(20). The receiving apparatus according to (11), wherein a timing from transmission of the first control information to transmission of the physical sidelink shared channel is fixed; or
the timing from the transmission of the first control information to the transmission of the physical sidelink shared channel is flexible and indicated in the first control information.
(21). A base station apparatus, comprising:
circuitry, operative to generate first control information for sidelink communication between a transmitting apparatus and a receiving apparatus; and
a transceiver, operative to transmit the first control information to the transmitting apparatus and the receiving apparatus,
wherein the sidelink communication comprises transmitting a physical sidelink shared channel, or comprises transmitting the physical sidelink shared channel and a first physical sidelink control channel with second control information.
(22). The base station apparatus according to (21), wherein the first control information is transmitted in a physical downlink control channel or a second physical sidelink control channel between the base station and terminal apparatuses including the transmitting apparatus and the receiving apparatus.
(23). The base station apparatus according to (21), transmission power of the physical sidelink shared channel is based on (1) path loss between the transmitting apparatus and the receiving apparatus, (2) geographical distance between the transmitting apparatus and the receiving apparatus, or (3) a configured value.
(24). The base station apparatus according to (21), wherein the first control information comprises an identification of the transmitting apparatus, an identification of the receiving apparatus, and Modulation Coding Scheme (MCS) for the physical sidelink shared channel.
(25). The base station apparatus according to (21), wherein the second control information at least comprises no indication on power control value for the physical sidelink shared channel.

(26). The base station apparatus according to (21), wherein when the first control information is received from the base station and the second control information is received from the transmitting apparatus, the receiving apparatus is operative to decode the physical sidelink shared channel using one of the first control information and the second control information; or the receiving apparatus is operative to compare the first control information and the second control information, and to decode the physical sidelink shared channel using one of the first control information and the second control information if the first control information is consistent with the second control information.

(27). The base station apparatus according to (21), wherein the transceiver is further operative to receive HARQ feedback information from the receiving apparatus after the receiving apparatus receives the physical sidelink shared channel from the transmitting apparatus.

(28). The base station apparatus according to (27), wherein the HARQ feedback information is carried on a physical sidelink feedback channel or a physical uplink control channel between the base station and the receiving apparatus.

(29). The base station apparatus according to (28), wherein transmission power of the physical sidelink feedback channel or the physical uplink control channel is based on path loss between the base station and the receiving apparatus.

(30). The base station apparatus according to (21), wherein a timing from transmission of the first control information to transmission of the physical sidelink shared channel is fixed; or the timing from the transmission of the first control information to the transmission of the physical sidelink shared channel is flexible and indicated in the first control information.

(31). A communicating method, comprising:

receiving, by a transmitting apparatus, from a base station, first control information for sidelink communication between the transmitting apparatus and a receiving apparatus; and transmitting, by the transmitting apparatus, a physical sidelink shared channel to the receiving apparatus according to the first control information, and not transmitting a first physical sidelink control channel to the receiving apparatus, or transmitting, by the transmitting apparatus, the physical sidelink shared channel to the receiving apparatus according to the first control information, and transmit the first physical sidelink control channel with second control information to the receiving apparatus.

(32). The communicating method according to (31), wherein the first control information is transmitted in a physical downlink control channel or a second physical sidelink control channel between the base station and terminal apparatuses including the transmitting apparatus and the receiving apparatus.

(33). The communicating method according to (31), the transmission power of the physical sidelink shared channel is based on (1) path loss between the transmitting apparatus and the receiving apparatus, (2) geographical distance between the transmitting apparatus and the receiving apparatus, or (3) a configured value.

(34). The communicating method according to (31), wherein the first control information comprises an identification of the transmitting apparatus, an identification of the receiving apparatus, and Modulation Coding Scheme (MCS) for the physical sidelink shared channel.

(35). The communicating method according to (31), wherein the second control information at least comprises no indication on power control value for the physical sidelink shared channel.

(36). The communicating method according to (31), wherein when the first control information is received from the base station and the second control information is received from the transmitting apparatus, the receiving apparatus is operative to decode the physical sidelink shared channel using one of the first control information and the second control information; or the receiving apparatus is operative to compare the first control information and the second control information, and to decode the physical sidelink shared channel using one of the first control information and the second control information if the first control information is consistent with the second control information.

(37). The communicating method according to (31), wherein the receiving apparatus is operative to transmit HARQ feedback information to the base station after receiving the physical sidelink shared channel from the transmitting apparatus.

(38). The communicating method according to (37), wherein the HARQ feedback information is carried on a physical sidelink feedback channel or a physical uplink control channel between the base station and the receiving apparatus.

(39). The communicating method according to (38), wherein transmission power of the physical sidelink feedback channel or the physical uplink control channel is based on path loss between the base station and the receiving apparatus.

(40). The communicating method according to (31), wherein a timing from transmission of the first control information to transmission of the physical sidelink shared channel is fixed; or the timing from the transmission of the first control information to the transmission of the physical sidelink shared channel is flexible and indicated in the first control information.

(41). A communicating method, comprising:

receiving, by a receiving apparatus, from a base station, first control information for decoding a physical sidelink shared channel;

receiving, by the receiving apparatus, the physical sidelink shared channel from the transmitting apparatus and not receiving a first physical sidelink control channel from the transmitting apparatus, or receiving, from the transmitting apparatus, the physical sidelink shared channel and the first physical sidelink control channel with second control information; and decoding, by the receiving apparatus, the physical sidelink shared channel.

(42). The communicating method according to (41), wherein the first control information is transmitted in a physical downlink control channel or a second physical sidelink control channel between the base station and terminal apparatuses including the transmitting apparatus and the receiving apparatus.

(43). The communicating method according to (41), wherein transmission power of the physical sidelink shared channel is based on (1) path loss between the transmitting apparatus and the receiving apparatus, (2)

geographical distance between the transmitting apparatus and the receiving apparatus, or (3) a configured value.

(44). The communicating method according to (41), wherein the first control information comprises an identification of the transmitting apparatus, an identification of the receiving apparatus, and Modulation Coding Scheme (MCS) for the physical sidelink shared channel.

(45). The communicating method according to (41), wherein the second control information at least comprises no indication on power control value for the physical sidelink shared channel.

(46). The communicating method according to (41), the communicating method further comprising, when the first control information is received from the base station and the second control information is received from the transmitting apparatus:
decoding the physical sidelink shared channel using one of the first control information and the second control information; or
comparing the first control information and the second control information, and decoding the physical sidelink shared channel using one of the first control information and the second control information if the first control information is consistent with the second control information.

(47). The communicating method according to (41), the communicating method further comprising transmitting HARQ feedback information to the base station after receiving the physical sidelink shared channel from the transmitting apparatus.

(48). The communicating method according to (47), wherein the HARQ feedback information is carried on a physical sidelink feedback channel or a physical uplink control channel between the base station and the receiving apparatus.

(49). The communicating method according to (48), wherein transmission power of the physical sidelink feedback channel or the physical uplink control channel is based on path loss between the base station and the receiving apparatus.

(50). The communicating method according to (41), wherein a timing from transmission of the first control information to transmission of the physical sidelink shared channel is fixed; or
the timing from the transmission of the first control information to the transmission of the physical sidelink shared channel is flexible and indicated in the first control information.

(51). A communicating method, comprising:
generating, by a base station, first control information for sidelink communication between a transmitting apparatus and a receiving apparatus; and
transmitting, by the base station, the first control information to the transmitting apparatus and the receiving apparatus,
wherein the sidelink communication comprises transmitting a physical sidelink shared channel, or comprises transmitting the physical sidelink shared channel and a first physical sidelink control channel with second control information.

(52). The communicating method according to (51), wherein the first control information is transmitted in a physical downlink control channel or a second physical sidelink control channel between the base station and terminal apparatuses including the transmitting apparatus and the receiving apparatus.

(53). The communicating method according to (51), transmission power of the physical sidelink shared channel is based on (1) path loss between the transmitting apparatus and the receiving apparatus, (2) geographical distance between the transmitting apparatus and the receiving apparatus, or (3) a configured value.

(54). The communicating method according to (51), wherein the first control information comprises an identification of the transmitting apparatus, an identification of the receiving apparatus, and Modulation Coding Scheme (MCS) for the physical sidelink shared channel.

(55). The communicating method according to (51), wherein the second control information at least comprises no indication on power control value for the physical sidelink shared channel.

(56). The communicating method according to (51), wherein when the first control information is received from the base station and the second control information is received from the transmitting apparatus,
the receiving apparatus is operative to decode the physical sidelink shared channel using one of the first control information and the second control information; or
the receiving apparatus is operative to compare the first control information and the second control information, and to decode the physical sidelink shared channel using one of the first control information and the second control information if the first control information is consistent with the second control information.

(57). The communicating method according to (51), wherein the communicating method further comprising: receiving HARQ feedback information from the receiving apparatus after the receiving apparatus receives the physical sidelink shared channel from the transmitting apparatus.

(58). The communicating method according to (57), wherein the HARQ feedback information is carried on a physical sidelink feedback channel or a physical uplink control channel between the base station and the receiving apparatus.

(59). The communicating method according to (58), wherein transmission power of the physical sidelink feedback channel or the physical uplink control channel is based on path loss between the base station and the receiving apparatus.

(60). The communicating method according to (51), wherein a timing from transmission of the first control information to transmission of the physical sidelink shared channel is fixed; or
the timing from the transmission of the first control information to the transmission of the physical sidelink shared channel is flexible and indicated in the first control information.

(61). A receiving apparatus, comprising:
a receiver, operative to receive sidelink transmission from a transmitting apparatus; and
a transmitter, operative to transmit sidelink HARQ feedback information to a gNB.

(62). The receiving apparatus according to (61), wherein, the sidelink HARQ feedback information is transmitted via PSFCH or PUCCH.

(63). The receiving apparatus according to (61), wherein, transmission power of a sidelink feedback channel carrying the sidelink HARQ feedback information is based on path loss of the gNB to the receiving apparatus.

(64). A transmitting apparatus, comprising:
circuitry, operative to generate a sidelink signal for sidelink transmission; and
a transceiver, operative to perform the sidelink transmission to a receiving apparatus,
wherein the receiving apparatus is operative to transmit sidelink HARQ feedback information to a gNB after receiving the sidelink transmission from the transmitting apparatus.

(65). The transmitting apparatus according to (64), wherein, the sidelink HARQ feedback information is transmitted via PSFCH or PUCCH.

(66). The transmitting apparatus according to (64), wherein, transmission power of a sidelink feedback channel carrying the sidelink HARQ feedback information is based on path loss of the gNB to the receiving apparatus.

(67). A base station, comprising:
a transceiver, operative to receive sidelink HARQ feedback information from a receiving apparatus; and
circuitry, operative to process the received sidelink HARQ feedback information,
wherein the sidelink HARQ feedback information is transmitted after the receiving apparatus receives sidelink transmission from a transmitting apparatus.

(68). The base station according to (67), wherein, the sidelink HARQ feedback information is transmitted via PSFCH or PUCCH.

(69). The base station according to (67), wherein, transmission power of a sidelink feedback channel carrying the sidelink HARQ feedback information is based on path loss of the gNB to the receiving apparatus.

(70). A communicating method for a receiving apparatus, comprising:
receiving, by the receiving apparatus, sidelink transmission from a transmitting apparatus; and
transmitting, by the receiving apparatus, sidelink HARQ feedback information to a gNB.

(71). The communicating method according to (70), wherein, the sidelink HARQ feedback information is transmitted via PSFCH or PUCCH.

(72). The communicating method according to (70), wherein, transmission power of a sidelink feedback channel carrying the sidelink HARQ feedback information is based on path loss of the gNB to the receiving apparatus.

(73). A communicating method for a transmitting apparatus, comprising:
generating, by the transmitting apparatus, a sidelink signal for sidelink transmission; and
performing, by the transmitting apparatus, the sidelink transmission to a receiving apparatus,
wherein sidelink HARQ feedback information is transmitted from the receiving apparatus to a gNB after the sidelink transmission is received by the receiving apparatus.

(74). The communicating method according to (73), wherein, the sidelink HARQ feedback information is transmitted via PSFCH or PUCCH.

(75). The communicating method according to (73), wherein, transmission power of a sidelink feedback channel carrying the sidelink HARQ feedback information is based on path loss of the gNB to the receiving apparatus.

(76). A communicating method for a base station, comprising:
receiving, by the base station, sidelink HARQ feedback information from a receiving apparatus; and
processing, by the base station, the received sidelink HARQ feedback information,
wherein the sidelink HARQ feedback information is transmitted after the receiving apparatus receives sidelink transmission from a transmitting apparatus.

(77). The communicating method according to (76), wherein, the sidelink HARQ feedback information is transmitted via PSFCH or PUCCH.

(78). The communicating method according to (76), wherein, transmission power of a sidelink feedback channel carrying the sidelink HARQ feedback information is based on path loss of the gNB to the receiving apparatus.

The invention claimed is:

1. A transmitting apparatus, comprising:
a receiver, operative to receive, from a base station, first control information, which includes a Modulation Coding Scheme (MCS) of a physical sidelink shared channel, for sidelink communication between the transmitting apparatus and a receiving apparatus; and
a transmitter, operative to transmit the physical sidelink shared channel to the receiving apparatus according to the first control information,
wherein, in a case where the transmitting apparatus does not transmit a first physical sidelink control channel to the receiving apparatus and the receiving apparatus receives the first control information from the base station, the receiving apparatus is operative to decode the physical sidelink shared channel using the first control information received from the base station.

2. The transmitting apparatus according to claim 1, wherein the first control information is transmitted in a physical downlink control channel or a second physical sidelink control channel between the base station and terminal apparatuses including the transmitting apparatus and the receiving apparatus.

3. The transmitting apparatus according to claim 1, the transmitting apparatus further comprising circuitry, operative to control transmission power of the physical sidelink shared channel based on (1) path loss between the transmitting apparatus and the receiving apparatus, (2) geographical distance between the transmitting apparatus and the receiving apparatus, or (3) a configured value.

4. The transmitting apparatus according to claim 1, wherein the first control information comprises an identification of the transmitting apparatus, an identification of the receiving apparatus, and the MCS for the physical sidelink shared channel.

5. The transmitting apparatus according to claim 1, wherein a timing from transmission of the first control information to transmission of the physical sidelink shared channel is fixed; or
the timing from the transmission of the first control information to the transmission of the physical sidelink shared channel is flexible and indicated in the first control information.

6. A receiving apparatus, comprising:
a transceiver, operative to receive, from a transmitting apparatus, a physical sidelink shared channel; and
circuitry, operative to decode the physical sidelink shared channel,
wherein the transceiver is operative to receive, from a base station, first control information, which includes a Modulation Coding Scheme (MCS) of the physical sidelink shared channel, for decoding the physical sidelink shared channel, wherein, in a case where the receiving apparatus does not receive a first physical sidelink control channel from the transmitting apparatus and the receiving apparatus receives the first control information from the base station, the receiving apparatus is operative to decode the physical sidelink shared channel using the first control information received from the base station.

7. A communicating method, comprising:

receiving, by a transmitting apparatus, from a base station, first control information, which includes a Modulation Coding Scheme (MCS) of a physical sidelink shared channel, for sidelink communication between the transmitting apparatus and a receiving apparatus; and transmitting, by the transmitting apparatus, the physical sidelink shared channel to the receiving apparatus according to the first control information, wherein, in a case where the transmitting apparatus does not transmit a first physical sidelink control channel to the receiving apparatus and the receiving apparatus receives the first control information from the base station, the receiving apparatus decodes the physical sidelink shared channel using the first control information received from the base station.

8. A communicating method, comprising:

receiving, by a receiving apparatus, from a base station, first control information, which includes a Modulation Coding Scheme (MCS) of a physical sidelink shared channel, for decoding the physical sidelink shared channel;

receiving, by the receiving apparatus, the physical sidelink shared channel from a transmitting apparatus; and decoding, by the receiving apparatus, the physical sidelink shared channel; and in a case where the receiving apparatus does not receive a first physical sidelink control channel from the transmitting apparatus and the receiving apparatus receives the first control information from the base station, decoding, by the receiving apparatus, the physical sidelink shared channel using the first control information received from the base station.

\* \* \* \* \*